US012690593B2

(12) United States Patent
Doshi

(10) Patent No.: US 12,690,593 B2
(45) Date of Patent: Jul. 28, 2026

(54) PESTICIDAL COMPOSITION

(71) Applicant: Hiteshkumar Anilkant Doshi, Thane (IN)

(72) Inventor: Hiteshkumar Anilkant Doshi, Thane (IN)

(73) Assignee: SML LIMITED, Mumbai (IN)

( * ) Notice: Subject to any disclaimer, the term of this patent is extended or adjusted under 35 U.S.C. 154(b) by 248 days.

(21) Appl. No.: 18/568,735

(22) PCT Filed: Jun. 8, 2022

(86) PCT No.: PCT/IB2022/055313
§ 371 (c)(1),
(2) Date: Dec. 8, 2023

(87) PCT Pub. No.: WO2022/259159
PCT Pub. Date: Dec. 15, 2022

(65) Prior Publication Data
US 2024/0268390 A1 Aug. 15, 2024

(30) Foreign Application Priority Data
Jun. 10, 2021 (IN) .............................. 202121025925

(51) Int. Cl.
*A01N 59/02* (2006.01)
*A01N 43/78* (2006.01)
*A01P 5/00* (2006.01)

(52) U.S. Cl.
CPC ............. *A01N 59/02* (2013.01); *A01N 43/78* (2013.01); *A01P 5/00* (2021.08)

(58) Field of Classification Search
CPC ............. A01N 59/02; A01N 43/78; A01P 5/00
See application file for complete search history.

(56) References Cited

U.S. PATENT DOCUMENTS

2013/0302446 A1 * 11/2013 Shah ....................... A01N 47/40
424/705
2017/0354152 A1 * 12/2017 Yoshimura ............. A01N 43/78
2021/0122681 A1 * 4/2021 Sawant .................... C05D 5/00

FOREIGN PATENT DOCUMENTS

WO WO-2018104787 A1 * 6/2018 ............ A01N 43/78
WO WO-2018207124 A1 * 11/2018 .............. C05G 5/12
WO 2019239358 A1 12/2019

OTHER PUBLICATIONS

M. Rumiani, et al. "Effect of elemental sulfur of the root-knot nematode, Meloidogyne incognita, activities in cucumber plants," Iranian Journal of Plant Pathology, vol. 52, issue 1, Aug. 2016, 85-98. (Year: 2016).*
International Search Report and Written Opinion from corresponding PCT Application No. PCT/IB2022/055313 mailed Sep. 14, 2022.

* cited by examiner

*Primary Examiner* — Michael P Cohen
(74) *Attorney, Agent, or Firm* — Vorys, Sater, Seymour and Pease LLP

(57) ABSTRACT

The invention relates to a pesticidal composition comprising elemental sulphur in the range of 20% w/w to 90% w/w; fluensulfone or salts or derivatives thereof in the range of 0.1% to 30% w/w; and at least one excipient. The pesticidal composition is in the form of solid, liquid or gel. The pesticidal composition in the form of water dispersible granules; water dispersible granules of capsulated suspension; liquid suspension or a suspension concentrates; suspoemulsion or a combination of capsulated suspension and suspension concentrate (ZC) has particles size range of 0.1 to 30 microns and the pesticidal composition in the form of wettable powders has particles size range of 0.1 micron to 60 microns. The invention further relates to a process of preparation of the pesticidal composition and a method of treating a plant, crop, plant propagation material, locus or parts thereof, a seed, seedling or surrounding soil with the pesticidal composition.

19 Claims, No Drawings

PESTICIDAL COMPOSITION

1. FIELD OF THE INVENTION

The present invention relates to a pesticidal composition comprising sulphur; fluensulfone or its salts or derivatives thereof; and at least one agrochemically acceptable excipient. More particularly, the invention relates to a pesticidal composition comprising elemental sulphur in the range of 20% w/w to 90% w/w of the total composition; fluensulfone or its salts or derivatives thereof in the range of 0.1% w/w to 30% w/w of the total composition; and at least one agrochemically acceptable excipient. The pesticidal composition is in the form of a liquid such as suspension concentrate or liquid suspension; suspoemulsion or a ZC composition (combination of capsulated suspension and suspension concentrate) or in the form of a solid such as wettable powders; water dispersible granules or water dispersible granules of capsulated suspension. Further, the pesticidal composition in the form of suspension concentrate or liquid suspension; suspoemulsion; ZC composition; water dispersible granules or water dispersible granules of capsulated suspension comprise particles in the size range of from 0.1 micron to 30 microns. The pesticidal composition in the form of wettable powders comprise particles in the size range of from 0.1 micron to 60 microns.

The invention further relates to a process of preparing the pesticidal composition comprising elemental sulphur in the range of 20% w/w to 90% w/w of the total composition; fluensulfone or its salts or derivatives thereof in the range of 0.1% w/w to 30% w/w of the total composition; and at least one agrochemically acceptable excipient.

The invention furthermore relates to a method of treating plants, crops, plant propagation materials, locus or parts thereof, seeds, seedlings or surrounding soil with the pesticidal composition comprising elemental sulphur; fluensulfone or its salts or derivatives thereof; and at least one agrochemically acceptable excipient.

2. BACKGROUND OF THE INVENTION

In describing the embodiment of the invention, specific terminology is chosen for the sake of clarity. However, it is not intended that the invention be limited to the specific terms so selected and it is to be understood that each specific term includes all technical equivalents that operate in a similar manner to accomplish a similar purpose.

Nematodes are agricultural pests that attack a wide range of crops, including common vegetables, crops, fruit trees and ornamental crops. Nematodes are difficult to control and easily spread between regions through the soil, tools or contaminated plants.

Plant-parasitic nematodes, a majority of which are root feeders, are found in association with most plants. Some are endoparasitic, living and feeding within the tissue of the plants while others are ectoparasitic, feeding externally through plant walls. Endoparasitic root feeders include economically important pests such as the root-knot nematodes, the reniform nematodes, the cyst nematodes, and the root-lesion nematodes. Direct feeding by nematodes can drastically decrease a plant's uptake of nutrients and water. Nematodes have the greatest impact on crop productivity when they attack the roots of seedlings immediately after seed germination. Nematode feeding also creates open wounds that provide entry to a wide variety of plantpathogenic fungi and bacteria. These microbial infections are often more economically damaging than the direct effects of nematode feeding.

Current pesticidal efficacy of known compounds is not satisfactory in the area of nematode or insect pest control. On account of diverse practices in different regions, pesticides at times, are administered at relatively higher dosages which eventually result in developing resistance among the insect pests or nematodes, thereby leading to soil toxicity and other environmental hazards, besides higher economic cost.

The current pesticidal combinations available are old chemistries and repeated use of such chemical combinations have caused problems in the control of insect or nematode pest population management like resistance of the nematodes or insect pests to the pesticide, pest resurgence, secondary pest outbreak, residue related problems, toxic effect on human beings and reduced yield.

Restricting substantial use of chemical pesticides and identifying an insecticidal composition which is effective at low dose, causes no cross-resistance to existing products, reduces toxicity while being environment friendly is very crucial.

Furthermore, there exists a continuous need for new insecticidal combinations to be applied so as to provide an economical and effective solution in terms of insect or nematode control, yield, plant growth, broader crop protection spectrum, reduced number of applications, while reducing the burden on the environment/farmers, provides healthy foliage, saves labour costs and is yet cost-effective to the end user.

Fluoroalkenyl thioether compounds such as fluensulfone has pleiotropic action and inhibit development, egg-laying, egg-hatching, feeding and locomotion in nematodes. Further, the role and benefits of sulphur as a pesticide has been known for a long time. Sulphur is considered as organic in nature and the benefits of the use of sulphur not only encompass reduced dependency on the use of chemicals as an effective mode of pest control but being organic in nature, it is also environment friendly, increases crop yield, improves food safety, human, animal or plant health and quality of life. Different formulations such as granules, pellets and powders are known for providing sulphur in a form for use as a fertilizer or pesticide. The use of sulphur as a fungicide, acaricide and miticide is of special importance and has been long used as an environment friendly mode of farming practice. Fluensulfone based pesticidal compositions have been known in the art. However, it is observed that application of single active compositions such as fluensulfone alone leads to the development of resistance in the pests on its prolonged use. Hence there is a need in the art to develop a combination of actives that decreases the chances of resistance development and improves the spectrum of disease and pest control.

There also exist a need for newer pesticides with modern integrated pest management for an improved toxicological and environmental profile such as reduced phytotoxicity, resistance management, reduced dosage, substantial broadening of spectrum, improved synergy and increased safety to humans along with reduced toxicity to the environment to name a few.

The inventors of the present invention have surprisingly developed a stable composition which includes effective amount of elemental sulphur; effective amounts of fluensulfone or its salts or derivatives thereof and at least one agrochemically acceptable excipient, whereby the composition is synergistic in nature and demonstrates excellent field efficacy. The inventors have surprisingly found that a composition comprising elemental sulphur and fluensulfone or its salts and derivatives thereof, is synergistic, acts as a superior crop-protectant, is non-phytotoxic, and effective at reduced dosages of application, helps in the resistance management observed with the old pesticide chemistry and also demonstrates increased yield on field application. The inventors have further found that a composition comprising elemental sulphur and fluensulfone or its salts and derivatives thereof when formulated as suspension concentrate or liquid suspension; suspoemulsion; ZC composition (combination of capsulated suspension and suspension concentrate); water dispersible granules or water dispersible granules of capsulated suspension with particles in the size range of 0.1 to 30 microns or when formulated as wettable powder with particles in the size range of 0.1 to 60 microns not only exhibits superior efficacy on field application, but is also synergistic and provides surprising results not only as a crop protection agent but also as a yield enhancer.

3. SUMMARY OF THE INVENTION

The present invention relates to a pesticidal composition comprising effective amount of elemental sulphur; effective amount of fluensulfone or its salts or derivatives thereof and at least one agrochemically acceptable excipient.

According to an embodiment, elemental sulphur can be present in the range of 20% w/w to 90% w/w of the total composition; fluensulfone or its salts or derivatives thereof can be present in the range of 0.1% w/w to 30% w/w of the total composition.

According to an embodiment, the pesticidal composition of elemental sulphur and fluensulfone is preferably in the form of wettable powder; water dispersible granules; water dispersible granules of capsulated suspension; liquid suspension or suspension concentrates; suspo-emulsion composition; and a ZC composition which is a combination of capsulated suspension and suspension concentrate.

According to an embodiment, the pesticidal composition in the form of wettable powders comprises particles in the size range of 0.1 to 60 microns.

According to an embodiment, the pesticidal composition in the form of water dispersible granules; water dispersible granules of capsulated suspension; liquid suspension or suspension concentrates; suspo-emulsion composition; and a ZC composition which is a combination of capsulated suspension and suspension concentrates comprise particles in the size range of 0.1 to 30 microns.

The invention further relates to a process of preparation of the pesticidal composition comprising elemental sulphur in the range of 20% w/w to 90% w/w of the total composition; fluensulfone or its salts or derivatives thereof in the range of 0.1% w/w to 30% w/w of the total composition and at least one agrochemically acceptable excipient.

According to another embodiment, the invention also relates to a method of protection of the crop or improving its health or yield, by treating at least one of a plant, crop, or parts thereof, a plant propagation material, seed, seedling or surrounding soil with a pesticidal composition comprising an effective amount of elemental sulphur; an effective amount of fluensulfone or its salts or derivatives thereof and at least one agrochemically acceptable excipient.

4. DETAILED DESCRIPTION OF THE INVENTION

In describing the embodiment of the invention, specific terminology is chosen for the sake of clarity. However, it is not intended that the invention be limited to the specific terms so selected and it is to be understood that such specific terms include all technical equivalents that operate in a similar manner to accomplish a similar purpose. It is understood that any numerical range recited herein is intended to include all subranges subsumed. Also, unless denoted otherwise, percentage of components in a composition are presented as weight percent.

The terms "a" or "an", as used herein, are defined as one or more than one. The terms "including" and/or "having", as used herein, are defined as comprising (i.e., open language).

The term "Sulphur" used in the composition refers to elemental sulphur obtained through natural sources or synthetic sources. The term includes allotropes of elemental sulfur such as plastic (amorphous) sulfur, monoclinic sulfur, rhombic sulfur composed of S8 molecules, and other ring molecules such as S7 and S12. The term also comprises sulphur produced through processing and refining of petrochemicals. The term also comprises 'biosulfur'. The term also comprises elemental Sulphur produced through microbial processes.

As described herein, water dispersible granule is defined as a formulation which disperses or dissolves rapidly when added to water to give a fine particle suspension. As described herein, "WG" or "WDG" refer to water dispersible granules. Water-dispersible granules are formulated as small, easily measured granules by blending and agglomerating ground active ingredients together with surfactants and other formulation excipients which disperses into finer/primary particles upon addition to water.

According to the invention, the term liquid suspension encompasses "aqueous suspension" or aqueous dispersion" or "suspension concentrates (SC)" composition. Liquid suspension can be defined as a composition wherein solid particles are dispersed or suspended in a liquid. The liquid as a vehicle can be water and/or a water miscible solvent.

As defined herein, WP refers to a wettable powder, which can be a powder formulation to be applied as a suspension after dispersion in water.

As defined herein, CS or capsulated suspension refers to a formulation which is a combination of an active ingredient encapsulated in polymer shell suspended in water with one or more surfactants, wherein the suspension may include a further active. Water dispersible granules of capsulated suspension relates to a granular composition obtained by spray drying a capsulated suspension composition.

As defined herein, ZC formulations are a combination of capsulated suspensions and suspension concentrates such that the formulation contains a stable aqueous suspension of microcapsules and a suspension of solid fine particles (in an aqueous phase), each of which contains at least one active ingredient.

As defined herein, aqueous suspo-emulsion is essentially a mixture of water-insoluble active constituents dispersed in a water-based solution; where one (or more) of the active constituents is a solid, formulated as a suspension form (SC) and one (or more) of the actives is an oil, formulated as an emulsion in water (EW).

The present invention relates to a pesticidal composition comprising effective amount of elemental sulphur; effective amount of fluensulfone or its salts or derivatives thereof; and at least one agrochemically acceptable excipient.

The invention particularly relates to a pesticidal composition comprising elemental sulphur present in the range of 20% w/w to 90% w/w of the total composition; fluensulfone or its salts or derivatives thereof present in the range of 0.1% w/w to 30% w/w of the total composition; and at least one agrochemically acceptable excipient.

According to an embodiment, elemental sulphur is present in the range of 20% w/w to 90% w/w of the total composition. According to an embodiment, elemental sulphur is present in the range of 20% w/w to 85% w/w of the total composition. According to an embodiment, elemental sulphur is present in the range of 20% w/w to 80% w/w of the total composition. According to an embodiment, elemental sulphur is present in the range of 20% w/w to 70% w/w of the total composition. According to an embodiment, elemental sulphur is present in the range of 20% w/w to 60% w/w of the total composition. According to an embodiment, elemental sulphur is present in the range of 20% w/w to 50% w/w of the total composition.

According to an embodiment, fluensulfone or its salts or derivatives thereof is present in the range of 0.1% to 30% w/w of the total composition. According to an embodiment, fluensulfone or its salts or derivatives thereof is present in the range of 0.1% to 25% w/w of the total composition. According to an embodiment, fluensulfone or its salts or derivatives thereof is present in the range of 0.1% to 20% w/w of the total composition. According to an embodiment, fluensulfone or its salts or derivatives thereof is present in the range of 0.1% to 15% w/w of the total composition. According to an embodiment, fluensulfone or its salts or derivatives thereof is present in the range of 0.1% to 10% w/w of the total composition. According to an embodiment, fluensulfone or its salts or derivatives thereof is present in the range of 0.10% to 5% w/w of the total composition.

According to an embodiment, the pesticidal composition is in the form of a solid, a liquid or a gel or a paste.

According to an embodiment, the liquid pesticidal composition is in the form of suspension concentrate or liquid suspension, flowable concentrate, seed dressing, suspoemulsion or a combination of capsulated suspension and suspension concentrate (ZC).

According to an embodiment, the liquid pesticidal composition comprises sulphur in a range of 20% w/w to 60% w/w of the total composition and fluensulfone or salts or derivatives thereof in the range of 0.1% w/w to 15% w/w of the total composition.

According to an embodiment, the liquid pesticidal composition is preferably in the form of a liquid suspension or a suspension concentrate; a suspo-emulsion composition; and a ZC composition which is a combination of capsulated suspension and suspension concentrate.

According to an embodiment, the liquid pesticidal composition is preferably in the form of a liquid suspension or a suspension concentrate. According to an embodiment, the liquid suspension or a suspension concentrate comprises sulphur in a range of 20% w/w to 60% w/w of the total composition and fluensulfone or its salts or derivatives thereof in the range of 0.1% w/w to 5% w/w of the total composition.

According to an embodiment, the liquid pesticidal composition is preferably in the form of a suspo-emulsion. According to an embodiment, the suspo-emulsion composition comprises sulphur in a range of 20% w/w to 55% w/w of the total composition and fluensulfone or its salts or derivatives thereof in the range of 0.1% w/w to 15% w/w of the total composition.

According to an embodiment, the liquid pesticidal composition is preferably in the form of a ZC composition (combination of capsulated suspension and suspension concentrate).

According to an embodiment, the ZC composition comprises sulphur in a range of 20% w/w to 30% w/w of the total composition and fluensulfone or its salts or derivatives thereof in the range of 1% w/w to 15% w/w of the total composition.

According to an embodiment, the solid pesticidal composition is in the form of powders, granules or dust.

According to an embodiment, the pesticidal composition is in the form of powders including wettable powders or dispersible powders and soluble powders. According to an embodiment, the pesticidal composition is in the form of granules including one of broadcast granules, pellets, extruded granules, water dispersible granules, and water dispersible granules of capsulated suspension.

According to an embodiment, the pesticidal composition is preferably in the form of wettable powders.

According to an embodiment, the wettable powder composition comprises sulphur in a range of 20% w/w to 90% w/w of the total composition and fluensulfone or its salts or derivatives thereof in the range of 0.1% w/w to 30% w/w of the total composition.

According to an embodiment, the pesticidal composition is preferably in the form of water dispersible granules.

According to an embodiment, the water dispersible granular composition comprises sulphur in a range of 20% w/w to 88% w/w of the total composition and fluensulfone or its salts or derivatives thereof in the range of 0.10% w/w to 10% w/w of the total composition.

According to an embodiment, the pesticidal composition is preferably in the form of a water dispersible granules of capsulated suspension.

According to an embodiment, the water dispersible granules of capsulated suspension comprise sulphur in a range of 20% w/w to 60% w/w of the total composition and fluensulfone or its salts or derivatives thereof in the range of 0.1% w/w to 30% w/w of the total composition.

According to an embodiment, the pesticidal composition is in the form of water dispersible granules or water dispersible granules of capsulated suspension, where the granules are in the size range of 0.05 mm to 3 mm. According to an embodiment, the pesticidal composition is in the form of water dispersible granules or water dispersible granules of capsulated suspension, where the granules are in the size range of 0.05 mm to 2.5 mm. According to an embodiment, the pesticidal composition is in the form of water dispersible granules or water dispersible granules of capsulated suspension, where the granules are in the size range of 0.05 mm to 2.0 mm. According to an embodiment, the pesticidal composition is in the form of water dispersible granules or water dispersible granules of capsulated suspension, where the granules are in the size range of 0.05 mm to 1.5 mm.

According to an embodiment, the pesticidal composition in the form of wettable powders comprise particles in the size range of 0.1 micron to 60 microns.

According to an embodiment, the pesticidal composition in the form of water dispersible granules; water dispersible granules of capsulated suspension; liquid suspensions or suspension concentrates; suspoemulsion or ZC composition comprises particles in the size range of 0.1 micron to 30 microns. According to an embodiment, the pesticidal composition in the form of water dispersible granules; or water dispersible granules of capsulated suspension; liquid suspensions or suspension concentrates; suspoemulsion or ZC composition comprises particles in the size range of 0.1 micron to 25 microns. According to an embodiment, the pesticidal composition in the form of water dispersible granules; or water dispersible granules of capsulated suspension; liquid suspensions or suspension concentrates; suspoemulsion or ZC composition comprises particles in the size range of 0.1 micron to 20 microns. According to an embodiment, the pesticidal composition in the form of water dispersible granules; or water dispersible granules of capsulated suspension; liquid suspensions or suspension concentrates; suspoemulsion or ZC composition comprises particles in the size range of 0.1 micron to 10 microns.

According to an embodiment, the pesticidal composition comprises at least one agrochemically acceptable excipient. According to further embodiment, agrochemically acceptable excipients comprise at least one surfactant, binders or binding agents; wetting agents; emulsifiers; fillers or carriers or diluents; coating agents; buffers or pH adjusters or neutralizing agents; antifoaming agents or defoamers; penetrants; UV protecting agents; UV absorbents; UV rays scattering agents; stabilizers; pigments; colorants; structuring agents; chelating or complexing or sequestering agent; thickeners; suspending agents or suspension aid agents or anticaking agents or anti-settling agents; viscosity modifiers or rheology modifiers; tackifiers; humectants; spreading agents; sticking agents; anti-freezing agents or freeze point depressants; solvents; preservatives or bactericides or antifungal agents or biocides or anti-microbial agents or antioxidants; polymers; monomers; cross-linking agents; permeability enhancing agents; protective colloids and mixtures thereof.

According to an embodiment, the surfactants include one or more of anionic, cationic, non-ionic, amphoteric, zwitterionic and polymeric surfactants. According to an embodiment, the surfactants include one or more of emulsifiers, wetting agents and dispersing agents. However, those skilled in the art will appreciate that it is possible to utilize additional agrochemically acceptable excipients without departing from the scope of the present invention. The agrochemically acceptable excipients are commercially manufactured and available through various companies.

According to an embodiment, the pesticidal composition in the form of water dispersible granules or wettable powder composition comprises at least one agrochemical excipient which includes dispersing agents, surfactants, wetting agents, binders or fillers or carriers or diluents, antifoaming agents, ultraviolet absorbents, UV ray scattering agents, anticaking agents or antisettling or suspension aid or suspending agents, sticking agents, pigments, colorants, and stabilizers. However, those skilled in the art will appreciate that it is possible to utilize additional agrochemically acceptable excipients without departing from the scope of the present invention.

According to an embodiment, the liquid pesticidal composition in the form of suspension concentrate or liquid suspension or suspoemulsion composition comprises at least one agrochemical excipient which includes dispersing agents, structuring agents, surfactants, humectants, solvents, suspending agents or suspension aid or anticaking agent or antisettling agents, penetrating agents, sticking agents, ultraviolet absorbents, UV ray scattering agents, buffers or pH adjusters or neutralizing agents, stabilizers, emulsifiers, biocides, antifreezing agents or freeze point depressants, and antifoaming agents. However, those skilled in the art will appreciate that it is possible to utilize additional agrochemically acceptable excipients without departing from the scope of the present invention.

According to an embodiment, the ZC composition comprises at least one agrochemical excipient which includes at least one dispersing agents, structuring agents, surfactants, wetting agents, humectants, solvents, suspending agents or suspension aid or anticaking agents or antisettling agents, penetrating agents, sticking agents, ultraviolet absorbents, UV ray scattering agents, buffers or pH adjusters or neutralizing agents, stabilizers, emulsifiers, biocides, antifreezing agents or freeze point depressants, antifoaming agents, monomers such as isocyanates and diamines or glycols, cross-linking agents, polymers, protective colloids and permeability enhancing agents However, those skilled in the art will appreciate that it is possible to utilize additional agrochemically acceptable excipients without departing from the scope of the present invention.

According to an embodiment, the water dispersible granules of capsulated suspension comprise at least one agrochemical excipient which includes dispersing agents, surfactants, wetting agents, suspending agents or suspension aid or anticaking agents or antisettling agents, penetrating agents, sticking agents, ultraviolet absorbents, UV ray scattering agents, buffers or pH adjusters or neutralizing agents, stabilizers, emulsifiers, antifoaming agents, monomers, polymers, cross-linking agents, permeability enhancing agents, protective colloids and stabilizers. However, those skilled in the art will appreciate that it is possible to utilize additional agrochemically acceptable excipients without departing from the scope of the present invention.

According to an embodiment, the agrochemically acceptable excipient is present in the range of from 5% w/w to 75% w/w of the total composition. According to an embodiment, the agrochemically acceptable excipient is present in the range of from 5% w/w to 70% w/w of the total composition. According to an embodiment, the agrochemically acceptable excipient is present in the range of from 5% w/w to 60% w/w of the total composition. According to an embodiment, the agrochemically acceptable excipient is present in the range of from 5% w/w to 50% w/w of the total composition. According to an embodiment, the agrochemically acceptable excipient is present in the range of from 5% w/w to 40% w/w of the total composition. According to an embodiment, the agrochemically acceptable excipient is present in the range of from 5% w/w to 30% w/w of the total composition.

According to an embodiment, the surfactants which are used in the pesticidal composition include one or more of anionic, cationic, non-ionic, amphoteric, zwitterionic and polymeric surfactants. According to an embodiment, the surfactants include one or more of emulsifiers, wetting agents and dispersing agents.

The anionic surfactants include one or more of, but not limited to a salt of fatty acid, a benzoate, a polycarboxylate, a salt of alkylsulfuric acid ester, alkyl ether sulfates, an alkyl sulfate, an alkylaryl sulfate, an alkyl diglycol ether sulfate, a salt of alcohol sulfuric acid ester, an alkyl sulfonate, an alkylaryl sulfonate, a lignin sulfonate, an alkyldiphenyletherdisulfonate, styrene acrylic polymers, a polystyrene sulfonate, a salt of alkylphosphoric acid ester, an alkylaryl phosphate, styrylaryl hydroxyl phosphate or their derivatives, a styrylaryl phosphate, docusates, a salt of polyoxyethylene alkyl ether sulfuric acid ester, a polyoxyethylenealkylaryl ether sulfate, alkyl sarcosinates, alpha olefin sulfonate sodium salt, alkyl benzene sulfonate or its salts, sodium lauroylsarcosinate, sulfosuccinates, polyacrylates, salts of polyacrylates, salt of polyoxyethylenealkylaryl ether sulfuric acid ester, a polyoxyethylene alkyl ether phosphate, a salt of polyoxyethylenealkylaryl phosphoric acid ester, ethoxylated alkylaryl phosphate esters, sulfosuccinates— mono and other diesters, phosphate esters, alkyl naphthalene sulfonate condensate (Terrsperse 2020) alkyl naphthalene sulfonates such as isopropyl and butyl derivatives, alkyl ether sulfates-sodium and ammonium salts; alkyl aryl ether phosphates, a salt of polyoxyethylene aryl ether phosphoric acid ester, mono-alkyl sulphosuccinates, aromatic hydrocarbon sulphonates, 2-acrylamido-2-methylpropane sulfonic acid, ammonium lauryl sulfate, ammonium perfluorononanoate, Disodium cocoamphodiacetate, Magnesium laureth sulfate, Perfluorobutanesulfonic acid, Perfluorononanoic acid, carboxylates, Perfluorooctanesulfonic acid, Perfluorooctanoic acid, Phospholipid, Potassium lauryl sulfate, Soap, Soap substitute, Sodium alkyl sulfate, Sodium dodecyl sulfate, Sodium dodecyl benzenesulfonate, Sodium laurate, Sodium laureth sulfate, Sodium lauroylsarcosinate, Sodium myreth sulfate, Sodium nonanoyloxybenzenesulfonate, Sodium pareth sulfate, alkyl carboxylates, Sodium stearate, alpha olefin sulphonates, naphthalene sulfonate salts, alkyl naphthalene sulfonate fatty acid salts, naphthalene sulfonate condensates-sodium salt, fluoro carboxylate, fatty alcohol sulphates, alkyl naphthalene sulfonate condensates-sodium salt, a naphthalene sulfonic acid condensed with formaldehyde or a salt of alkylnaphthalene sulfonic acid condensed with formaldehyde; or salts, derivatives thereof.

Other anionic surfactants which have been found to be useful include taurate surfactants like sodium N-cyclohexyl-N-palmitoyl taurate, sodium N-methyl-N-oleoyl taurate, respectively, sold under the tradenames, Igepon CN-42, Igepon T-33, T-43, T-51, T-73, T-77, and T-74 by GAF Corporation, Chemical Products, New York, N.Y., 10020. Sodium N-methyl-N-oleoyl taurate is also available under the tradename "Adinol" from Croda Chemicals, Ltd., England.

Cationic surfactants include one or more of, but not limited to Dialkyl dimethyl ammonium chlorides, Alkyl methyl ethoxylated ammonium chlorides or salts, Dodecyl-, Coco-, Hexadecyl-, Octadecyl-, Octadecyl/Behenyl-, Behenyl-, Cocoamidopropyl-, Trimethyl Ammonium Chloride; Coco-, Stearyl-, bis(2-hydroxyethyl)Methyl Ammonium Chloride, Benzalkonium Chloride, Alkyl-, Tetradecyl-, Octadecyl-Dimethyl Benzyl Ammonium Chloride, Dioctyl-, Di(Octyl-Decyl)-, Didecyl-, Dihexadecyl-Distearyl-, Di(Hydrogenated Tallow)-Dimethyl Ammonium Chloride, Di(Hydrogenated Tallow) Benzyl-, Trioctyl-, Tri(Octyl-Decyl)-, Tridodecyl-, Trihexadecyl-Methyl Ammonium Chloride, Dodecyl Trimethyl-, Dodecyl Dimethyl Benzyl-, Di-(Octyl-Decyl) Dimethyl, Didecyl Dimethyl-Ammonium Bromide, Quaternised amine ethoxylates, Behentrimonium chloride, Benzalkonium chloride, Benzethonium chloride, Benzododecinium bromide, Bronidox, quaternary ammonium salts Carbethopendecinium bromide, Cetalkonium chloride, Cetrimonium bromide, Cetrimonium chloride, Cetylpyridinium chloride, Didecyldimethylammonium chloride, Dimethyldioctadecylammonium bromide, Dimethyldioctadecylammonium chloride, Domiphen bromide, Lauryl methyl gluceth-10 hydroxypropyldimonium chloride, Octenidinedihydrochloride, Olaflur, N-Oleyl-1,3-propanediamine, Pahutoxin, Stearalkonium chloride, Tetramethylammonium hydroxide, Thonzonium bromide; salts or derivatives thereof.

The non-ionic surfactants include one or more of but not limited to polyol esters, polyol fatty acid esters, polyethoxylated esters, polyethoxylated alcohols, ethoxylated and propoxylated fatty alcohols, ethoxylated and propoxylated alcohols, EO/PO copolymers; EO and PO block copolymers, di, tri-block copolymers; block copolymers of polyethylene glycol and polypropylene glycol, poloxamers, polysorbates, alkyl polysaccharides such as alkyl polyglycosides and blends thereof, amine ethoxylates, sorbitan fatty acid ester, glycol and glycerol esters, glucosidyl alkyl ethers, polyoxyethylene glycol, sorbitan alkyl esters, sorbitan derivatives, fatty acid esters of sorbitan (Spans) and their ethoxylated derivatives (Tweens), and sucrose esters of fatty acids, Cetostearyl alcohol, Cetyl alcohol, ethylene oxide-propylene oxide copolymer surfactants sold under the trade names Atlas G5000 and TERMUL 5429, Decyl glucoside, Decylpolyglucose, Glycerol monostearate, Lauryl glucoside, Maltosides, Monolaurin, Narrow-range ethoxylate, Nonidet P-40, Nonoxynol-9, Nonoxynols, Octaethylene glycol monododecyl ether, N-Octyl beta-D-thioglucopyranoside, Octyl glucoside, Oleyl alcohol, PEG-10 sunflower glycerides, Pentaethylene glycol monododecyl ether, Polidocanol, Poloxamer, Poloxamer 407, Polyethoxylated tallow amine, Polyglycerol polyricinoleate, Polysorbate, Polysorbate 20, Polysorbate 80, Sorbitan derivatives, Sorbitan monolaurate, Sorbitan monostearate, Sorbitan tristearate, Stearyl alcohol, glyceryl laureate, lauryl glucoside, nonylphenolpolyethoxyethanols, nonyl phenol polyglycol ether, castor oil ethoxylate, polyglycol ethers, polyadducts of ethylene oxide and propylene oxide, block copolymer of polyalkylene glycol ether and hydroxystearic acid, tributylphenoxypolyethoxy ethanol, octylphenoxypolyethoxy ethanol, etho-propoxylated tristyrlphenols, ethopropoxylated block copolymers, ethoxylated alcohols, ethoxylated tristyrlphenols, polyoxy ethylene sorbitan, fatty acid polyglyceride, a fatty acid alcohol polyglycol ether, an oxyalkylene block polymer, a polyoxyethylene alkyl ether, a polyoxyethylenealkylaryl ether, a polyoxyethylenestyrylaryl ether, a polyoxyethylene glycol alkyl ether, polyethylene glycol, a polyoxyethylene fatty acid ester, a polyoxyethylenesorbitan fatty acid ester, a polyoxyethylene glycerin fatty acid ester, Alcohol ethoxylates —C6 to C16/18 alcohols, linear and branched, Alcohol alkoxylates—various hydrophobes and EO/PO contents and ratios, Fatty acid esters— mono and diesters; lauric, stearic and oleic; Glycerol esters—with and without EO; lauric, stearic, cocoa and tall oil derived, Ethoxylated glycerine, Sorbitan esters—with and without EO; lauric, stearic and oleic based; mono and triesters, Castor oil ethoxylates—5 to 200 moles EO; nonhydrogenated and hydrogenated, Block polymers, Amine oxides-ethoxylated and non-ethoxylated; alkyl dimethyl, Fatty amine ethoxylates-coco, tallow, stearyl, oleyl amines, a polyoxyethylene hydrogenated castor oil or a polyoxypropylene fatty acid ester; salts or derivatives thereof.

Amphoteric or Zwitterionic surfactants include one or more of, but not limited to one or more of derivatives of betaines, coco and lauryl amidopropyl betaines, Coco Alkyl Dimethyl Amine Oxides, alkyl dimethyl betaines; C8 to C18, Alkyl dipropionates-sodium lauriminodipropionate, Cocoamidopropylhydroxysulfobetaine, imidazolines, phospholipids phosphatidylserine, phosphatidylethanolamine, phosphatidylcholine, and sphingomyelins, Lauryl Dimethylamine Oxide, alkyl amphoacetates and propionates, alkyl Ampho(di)acetates, and dipropionates, lecithin and ethanolamine fatty amides; or salts, derivatives thereof. Surfactants that are commercially available under the trademark but are not limited to one or more of Atlas G5000, TERMUL 5429, TERMUL 2510, ECOTERIC®, EULSOGEN® 118, Genapol®X, Genapol®OX-080, Genapol® C 100, Emulsogen® EL 200, Arlacel P135, Hypermer 8261, Hypermer B239, Hypermer B261, Hypermer B246sf, Solutol HS 15, Promulgen™ D, Soprophor 7961P, Soprophor TSP/461, Soprophor TSP/724, Croduret 40, Etocas 200, Etocas 29, Rokacet R26, Cetomacrogol 1000, CHEMONIC OE-20, Triton N-101, Triton X-100, Tween 20, 40, 60, 65, 80, Span20, 40, 60, 80, 83, 85, 120, Brij@, Atlox 4912, Atlas G5000, TERMUL 3512, TERMUL 3015, TERMUL 5429, TERMUL 2510, ECOTERIC®, ECOTERIC® T85, ECO-TERIC® T20, TERIC 12A4, EULSOGEN® 118, Genapol®X, Genapol®OX-080, Genapol® C 100, Emulsogen® EL 200, Arlacel P135, Hypermer 8261, Hypermer B239, Hypermer B261, Hypermer B246sf, Solutol HS 15, Promulgen™ D, Soprophor 7961P, Soprophor TSP/461, Soprophor TSP/724, Croduret 40, Etocas 200, Etocas 29, Rokacet R26, CHEMONIC OE-20, Triton™ N-101, IGEPAL CA-630, Isoceteth-20, Hostapon 1306 and Agrilan 1208.

However, those skilled in the art will appreciate that it is possible to utilize other conventionally known surfactants without departing from the scope of the present invention. The surfactants are commercially manufactured and available commercially through various companies.

According to an embodiment, the surfactant is present in an amount of 0.10% to 60% w/w of the total composition. According to an embodiment, the surfactant is present in an amount of 0.1% to 40% w/w of the total composition. According to an embodiment; the surfactant is present in an amount of 0.10% to 30% w/w of the total composition. According to a further embodiment, the surfactant is present in an amount of 0.10% to 20% w/w of the total composition. According to an embodiment, the surfactant is present in an amount of 0.10% to 10% w/w of the total composition.

According to an embodiment, the dispersing agents which are used in the pesticidal composition includes, but not limited to one or more of phenol naphthalene sulphonates, lignin sulphonates, lignin derivatives, dibutylnaphthalene-sulfonic acid, alkylarylsulfonates, alkyl sulfates, alkylsulfonates, fatty alcohol sulfates, fatty acids and sulfated fatty alcohol glycol ethers, polyoxyethylenestyryl phenyl ether sulfate ester salts and the like, alkali metal salts thereof, ammonium salts or amine salts, polyoxyethylenestyryl phenyl ether, polyoxyethylenesorbitan alkyl esters, phosphate esters and the like, mixture of sodium salt of naphthalene sulphonic acid urea formaldehyde condensate and sodium salt of phenol sulphonic formaldehyde condensate polyaromatic sulfonates, sodium alkyl aryl sulfonates, glyceryl esters, ammonium salts of maleic anhydride copolymers, phosphate esters, salts of addition products of ethylene oxide and fatty acid esters, polycarboxylates, sodium salts of condensed phenolsulfonic acid as well as the napthalene sulfonate-formaldehyde condensates, sodium naphthalene sulfonate formaldehyde condensates, ammonium salts of sulfonated naphthalene, salts of polyacrylic acids, tristyrylphenolethoxylate phosphate esters; aliphatic alcohol ethoxylates; alkyl ethoxylates; graft copolymers, ammonium salts of sulfonated naphthalene, salts of polyacrylic acids, salts, derivatives thereof, Poly methyl methacrylate/Acrylic Graft co-polymer and its derivatives, sorbitan ester ethoxylates, Phosphate esters and its derivatives, stearic fatty acids and its derivatives, oleic fatty acids, vegetable fatty acids and tallow fatty acids ethoxylates.

Commercially available dispersing agents include "Morwet D425" (sodium naphthalene formaldehyde condensate ex Nouryon Corporation, USA) "Morwet EFW" Sulfated Alkyl Carboxylate and Alkyl Naphthalene Sulfonate-Sodium Salt "Tamol PP" (sodium salt of a phenolsulphonic acid condensate) "Reax 80N" (sodium lignosulphonate) "Wettol D1" sodium alkylnaphthalene sulphonate (ex BASF). However, those skilled in the art will appreciate that it is possible to utilize other conventionally known dispersants without departing from the scope of the present invention. The dispersing agents are commercially manufactured and available through various companies.

According to an embodiment, the dispersing agent is present in an amount of 0.1-60% w/w of the total composition. According to an embodiment, the dispersing agent is present in an amount of 1-60% w/w of the total composition. According to an embodiment, the dispersing agent is present in an amount of 5-60% w/w of the total composition. According to an embodiment, the dispersing agent is present in an amount of 5-50% w/w of the total composition.

According to an embodiment the wetting agents used in the pesticidal composition include, but not limited to one or more of phenol naphthalene sulphonates, alkyl naphthalene sulfonate and their salts, naphthalene sulphonates and the salts thereof, sodium alkyl naphthalene sulfonate, sodium salt of sulfonated alkylcarboxylate, polyoxyalkylated ethyl phenols, polyoxyethoxylated fatty alcohols, polyoxyethoxylated fatty amines, lignin derivatives, alkane sulfonates or their salts, alkylbenzene sulfonates, salts of polycarboxylic acids, salts of esters of sulfosuccinic acid, alkylpolyglycol ether sulfonates, alkyl ether phosphates, alkyl ether sulphates and alkyl sulfosuccinic monoesters, Alkyl polyglucoside, ethoxylated alkyl phenols, ethoxylated fatty acids, alkoxylated linear alcohols, polyoxyethylene alkyl ethers, dioctyl sulfosuccinate, lauryl sulfate, EO-PO block copolymers; Nonyl-phenol ethoxylates and its derivatives, Castor oil based ethoxylates, Lanolin alcohol ethoxylates, Polyol ethoxylates, Alkyl polysaccharide, or their salts or derivatives thereof. However, those skilled in the art will appreciate that it is possible to utilize other conventionally known wetting agents without departing from the scope of the present invention. The wetting agents are commercially manufactured and available through various companies.

According to an embodiment, the wetting agent is present in an amount of 0.1%-60% w/w of the total composition. According to an embodiment, the wetting agent is present in an amount of 0.1%-40% w/w of the total composition. According to an embodiment, the wetting agent is present in an amount of 0.1%-30% w/w of the total composition.

According to an embodiment, the emulsifiers used in the pesticidal composition include, but not limited to one or more of, alkylated benzene sulphonates, ethoxylated or alkoxylated tristyrylphenols, alkoxylated coplymers, fatty alcohol ethoxylates, fatty acid derivatives, sorbitol derivatives, castor oil ethoxylates and derivatives, ethoxylated phenols, ethoxylated alkylphenols, nonylphenol alkoxylates, alkylphenol alkoxylates, alcohol alkoxylates, sulphosuccinates, alkyletherphosphates, alkoxylated fatty alcohol phosphates (e.g. PEG 10 PPG 5 Cetyl phosphate), polyvinyl alcohol, polyvinylpyrrolidone or PVP, lignin sulfonate, Poly acrylates, polysorbates, polycarboxylates, alcohol ethoxylates, salt of alkyl aryl sulphonates derivative thereof. However, those skilled in the art will appreciate that it is possible to utilize other conventionally known emulsifiers without departing from the scope of the present invention. The emulsifiers are commercially manufactured and available through various companies.

Emulsifiers which are used in the pesticidal composition include but are not limited one or more of Atlas G5000, TERMUL 5429, TERMUL 2510, ECOTERIC®, EMULSOGEN® 118, Genapol®X, Genapol®OX-080, Genapol® C 100, Emulsogen® EL 200, Arlacel P135, Hypermer 8261, Hypermer B239, Hypermer B261, Hypermer B246sf, Solutol HS 15, Promulgen™ D, Soprophor 7961P, Soprophor TSP/461, Soprophor TSP/724, Croduret 40, Etocas 200, Etocas 29, Rokacet R26, CHEMONIC OE-20, Triton™ N-101, Tween 20, 40, 60, 65, 80, Span20, 40, 60, 80, 83, 85, 120, Brij@, Triton™ Atlox 4912, Atlas G5000, TERMUL 3512, TERMUL 3015, TERMUL 5429, TERMUL 2510, ECOTERIC®, ECOTERIC® T85, ECOTERIC® T20, TERIC 12A4, EULSOGEN® 118, Genapol®X, Genapol®OX-080, Genapol® C 100, Emulsogen® EL 200, Arlacel P135, Hypermer 8261, Hypermer B239, Hypermer B261, Hypermer B246sf, Solutol HS 15, Promulgen™ D, Soprophor 7961P, Soprophor TSP/461, Soprophor TSP/724, Croduret 40, Etocas 200, Etocas 29, Rokacet R26, CHE-MONIC OE-20, Triton™ N-101, Tween 20, 40, 60, 65, 80 and Span 20, 40, 60, 80, 83, 85, 120 can also be used. However, those skilled in the art will appreciate that it is possible to utilize other conventionally known emulsifiers without departing from the scope of the present invention. The emulsifiers are commercially manufactured and available through various companies.

According to an embodiment, the emulsifier is present in an amount of 0.1%-60% w/w of the total composition. According to an embodiment, the emulsifier is present in an amount of 0.1%-50% w/w of the total composition. According to an embodiment, the emulsifier is present in an amount of 0.1%-30% w/w of the total composition.

According to an embodiment, the solvents used in the pesticidal composition include water miscible solvents or water immiscible solvents.

The water miscible solvents include, but are not limited to Ethylene glycol, N-Methyl-2-pyrrolidone, 1,3-Propanediol, 1,5-Pentanediol, Propylene glycol, Triethylene glycol, 1,2-Butanediol, 1,3-Butanediol, 1,4-Butanediol, Dimethylformamide, Decanamide, Dimethoxyethane, Dimethyloctanamide, Dimethyldecanamide, Water, Propylene glycol, monoethylene glycol, poly ethylene glycol and its derivatives, glycerol, Sorbitol, Dimethyloctadecanamide, diethylene glycol monobutyl ether, diethylene glycol monoethyl ether, in general glycols and glycol ethers, alkylene carbonates, Dimethylformamide, Acetophenone, Cyclohexanone, dimethyl sulfoxide. However, those skilled in the art will appreciate that it is possible to utilize other water miscible solvents without departing from the scope of the present invention.

Solvents which can be used to dissolve the solid active ingredient, if necessary, include but are not limited to aromatic chlorinated hydrocarbons, chlorinated maleic hydrocarbons, ketones, long chain esters and mixtures thereof (commercially available as Solvesso 100, Solvesso 150, Solvesso 200, Solvesso 150ND, Solvesso 200ND, Aromatic 200, Hydrosol A 200, Hydrosol A 230/270, Caromax 20, Caromax 28, Aromat K 150, Aromat K 200, Shellsol A 150, Shellsol A 100, Fin FAS-TX 150, Fin FAST-TX 200, Xylene, Cyclohexane, Cyclopentane, Pentane, Hexane, Heptane, octane, nonane, decane, isooctane, benzene, 2-Methylpentane, 3-Methylpentane, 2-Methyl-hexane, 3-Methylhexane, 2-methylbutane, 2,3-Dimethylpentane, Methycyclopentane, Methylcyclohexane, 2,4 Dimethylpentane, aromatics such as, toluene, and the like; 1-Pentene, 2-Pentene, 1-Hexene, 1-Heptene, Ethylvinylether, Propylether, petroleum distillates, petroleum ether, and the like, Butylvinylether, Butylethylether, 1,2-Epoxybutane, Furan, Tetrahydropyran, 1-Butanal, 2-methylpropanal, 2-Pentanone, 3-Pentanone, Ethylformate, Propylformate, Isopropylformate, Methylacrylate, Ethylacrylate, Methylmethacrylate, Tetramethylsilane, substituted aromatics such as chlorobenzene, benzaldehyde, and the like and mixtures thereof. However, those skilled in the art will appreciate that it is possible to utilize other solvents known in the art without departing from the scope of the invention.

According to an embodiment, the solvent is present in an amount of 0.1-60% w/w of the total composition. According to an embodiment, the solvent is present in an amount of 0.1-40% w/w of the total composition. According to an embodiment, the solvent is present in an amount of 0.1-30% w/w of the total composition.

According to an embodiment, the binding agents or binders which are used in the pesticidal composition, include but are not limited to one or more of lactose, polyvinylyrrolidone, water soluble cellulose derivatives such as carboxymethyl cellulose, methyl cellulose, starch, dextrins, lignin sulphonates and carbohydrates such as monosaccharides, disaccharides, oligosaccharides and poly-saccharides, clays, kaolins, attapulgite, gum arabic and gum ghatti, carrageenan, polyacrylates, poly carboxylates, carbomers, derivatives and combinations thereof. However, those skilled in the art will appreciate that it is possible to utilize different binding agents without departing from the scope of the present invention. The binding agents are commercially manufactured and available through various companies.

According to an embodiment, the binding agent is present in an amount of 0.10% to 50% w/w of the composition. According to further embodiment, the binding agent is present in an amount of 0.1% to 30% w/w of the composition. According to further embodiment, the binding agent is present in an amount of 0.10% to 20% w/w of the composition. According to further embodiment, the binding agent is present in an amount of 0.1% to 10% w/w of the composition.

According to an embodiment, the carriers which are used in the pesticidal composition include, but are not limited to one or more of solid carriers or fillers or diluents. According to another embodiment, the carriers include mineral carriers, plant carriers, synthetic carriers, water-soluble carriers and water insoluble carriers. However, those skilled in the art will appreciate that it is possible to utilize different carriers without departing from the scope of the present invention. The carriers are commercially manufactured and available through various companies.

The solid carriers include natural minerals like clay such as bentonite, china clay, acid clay, dolomite, kaolin such as kaolinite, dickite, nacrite, and halloysite, synthetic and diatomaceous silicas, montmorillonite minerals such as sodium montmorillonite, smectites, such as saponite, hectorite, sauconite, and hyderite, micas, such as pyrophyllite, talc, agalmatolite, muscovite, phengite, sericite, and illite, silicas such as cristobalite, attapulgite, sepiolite; vermiculite, laponite, pumice, perlite, volclay, vermiculites, limestone, natural and synthetic silicates, charcoal, silica, powdered silica, fused silica, hydrophobic silica, wet process silicas, dry process silicas, calcined products of wet process silicas, surface-modified silicas, mica, zeolite, diatomaceous earth, derivatives thereof; fly ash, chalks (Omya®), fuller's earth, loess, mirabilite, white carbon, slaked lime, synthetic silicic acid, starch, modified starch (Pineflow, available from Matsutani Chemical industry Co., Ltd.), sucrose, potassium pyrophosphate, sodium tripolyphosphate, kaolin 1777, Lactose, maltodextrin, dextrin, sorbitol; salts of lignin sulphonates such as ammonium, sodium, calcium, zinc. Water insoluble carriers include, but not limited to clays, microcrystalline cellulose, perlite, volcanic ash, mica, calcium or magnesium carbonates, diatomaceous earth, soap stone, starch, hydrophobically or hydrophilically modified starch, calcium phosphates. Water soluble salts such as, citrate, nitrate, sulphate, hexametaphosphate, phosphate, Ammonium salts such as sulphate, phosphate, magnesium sulphate. However, those skilled in the art will appreciate that it is possible to utilize different solid carriers without departing from the scope of the present invention. The solid carriers are commercially manufactured and available through various companies.

According to an embodiment, the carrier is present in an amount of 0.1% to 70% w/w of the composition. According to further embodiment, the carrier is present in an amount of 0.1% to 60% w/w of the composition. According to further embodiment, the carrier is present in an amount of 0.1% to 50% w/w of the composition. According to further embodiment, the carrier is present in an amount of 0.10% to 40% w/w of the composition. According to further embodiment, the carrier is present in an amount of 0.1% to 20% w/w of the composition.

According to an embodiment, the anticaking agents which are used in the pesticidal composition include, but are not limited to one or more of precipitated Silica, fumed silica, hydrophobically modified silica, Perlite, Mica, Talc, soapstone, Magnesium Aluminum silicate, clays, Calcium silicate, Magnesium trisilicate, fumed silica (white carbon), ester gum, a petroleum resin, Foammaster® Soap L sodium stearate, sodium metasilicate, sodium carbonate, Sodium alumino silicates, calcium carbonate and magnesium carbonate, Magnesium stearate, calcium phosphate salts or derivatives thereof. However, those skilled in the art will appreciate that it is possible to utilize different anti caking agents without departing from the scope of the present invention. The anti-caking agents are commercially manufactured and available through various companies.

According to an embodiment, the antifoaming agents or defoamers which are used in the pesticidal composition include, but not limited to one or more of silica, siloxane, silicone dioxide, simethicone, dimethicone, polydimethyl siloxane and its derivatives, vegetable oils, petroleum oils, paraffin oil, polyethylene glycol, Silicone oils and magnesium stearate or derivatives thereof. Preferred antifoaming agents include silicone emulsions (such as, e.g., Silikon® SRE, Wacker or Rhodorsil® from Rhodia), long-chain alcohols, fatty acids. Non-silicone defoamers can also be used. However, those skilled in the art will appreciate that it is possible to utilize other conventionally known antifoaming agents without departing from the scope of the present invention. The antifoaming agents are commercially manufactured and available through various companies.

According to an embodiment, the anti-foaming agent is present in an amount of 0.010% to 20% w/w of the total composition. According to an embodiment, the anti-foaming agent is present in an amount of 0.01% to 10% w/w of the total composition. According to an embodiment, the anti-foaming agent is present in an amount of 0.010% to 50% w/w of the total composition. According to an embodiment, the anti-foaming agent is present in an amount of 0.01% to 1% w/w of the total composition.

According to an embodiment, the pH-adjusters or buffers or neutralizing agents which are used in the pesticidal composition include both acids and bases of the organic or inorganic type and mixtures thereof. According to further embodiment, pH-adjusters or buffers or neutralizing agents include, but not limited to one or more of organic acids, inorganic acids and alkali metal compounds or salts, derivatives thereof. According to an embodiment, the organic acids include, but not limited to one or more of acetic, propionic, citric, oxalic, malic, adipic, fumaric, maleic, succinic, tartaric acid, hydrochloric acid, nitric acid, sulphuric acid, phosphoric acid, boric acid, phytic acid or salts, derivatives thereof; and the mono-, di-, or tribasic salts of these acids or derivatives thereof. Alkali metal compounds include, but not limited to one or more of hydroxides of alkali metals such as sodium hydroxide and potassium hydroxide, carbonates of alkali metals such as sodium carbonate, hydrogencarbonates of alkali metals such as sodium hydrogencarbonate and alkali metal phosphates such as sodium phosphate, sodium dihydrogen phosphate; sodium hydroxide, potassium hydroxide, ammonium hydroxide, Borax, sodium borate; calcium carbonate, calcium hydroxide, Lime, potassium acetate, potassium bicarbonate, potassium carbonate, sodium acetate, sodium benzoate, sodium carbonate, sodium bicarbonate, sodium metasilicate, trisodium phosphate, ammonia, primary amines, secondary amines and tertiary amines and mixtures thereof. According to an embodiment, the salts of organic acids include, but not limited to one or more of alkali metal salts such as sodium citrate and the like. Mixtures can also be used to create a pH-adjusters or buffers or neutralizing agents. However, those skilled in the art will appreciate that it is possible to utilize other conventionally known pH-adjusters or buffers or neutralizing agents without departing from the scope of the present invention. The pH-adjusters or buffers or neutralizing agents are commercially manufactured and available through various companies.

According to an embodiment, the pH-adjusters or buffers are present in an amount of 0.01% to 20% w/w of the total composition. According to an embodiment, the pH-adjusters or buffers are present in an amount of 0.010% to 10% w/w of the total composition. According to an embodiment, the pH-adjusters or buffers are present in an amount of 0.01% to 5% w/w of the total composition. According to an embodiment, the pH-adjusters or buffers are present in an amount of 0.01% to 1% w/w of the total composition.

According to an embodiment, the spreading agents which are used in the pesticidal composition include, but not limited to one or more of silicone surfactants, copolymer of maleic acid with a styrene compound, a (meth)acrylic acid copolymer, a half ester of a polymer consisting of polyhydric alcohol with dicarboxylic anhydride, a water-soluble salt of polystyrenesulfonic acid, fatty acids, aliphatic alcohols, vegetable oils such as cottonseed, or inorganic oils, petroleum distillates, modified trisiloxanes, polyglycol, polyethers, polyoxyalkylated ethyl phenols, polyoxyethoxylated fatty alcohols, polyoxyethoxylated fatty amines, alkylpolyglycol ether sulfonates, alkyl ether phosphates, Alkyl polyglucoside, Alkyl polysaccharide, vegetable oil, mineral oils, petroleum oils, silicone oils, siloxanes, polyoxyalkylene alkyl ethers, polyoxyalkylene alkylphenyl ethers, polyoxyalkylene polyhydric alcohol fatty acid esters, polyhydric alcohol fatty acid esters, polyoxyalkylene alkylamines, alkyl polyglycosides and glycidyl ethers are preferable. Examples of polyhydric alcohols constituting a nonionic surfactant include divalent alcohols such as ethyleneglycol, 1,2-propyleneglycol, 1,3-propyleneglycol, 1,4-butanediol, 2,3-butanediol, 1,5-pentanediol, 1,6-hexanediol, 1,8-octanediol, neopentyl glycol or 2-methyl-1,3-propanediol, trivalent alcohols such as glycerol, clathrates or salts or derivatives thereof. Commercially available spreading agents include Silwet L77 and Silwet 408 and the like. However, those skilled in the art will appreciate that it is possible to utilize other conventionally known spreading agents without departing from the scope of the present invention. The spreading agents are commercially manufactured and available through various companies.

According to an embodiment, the spreading agent is present in an amount of 0.1% to 20% w/w of the total composition. According to an embodiment, the spreading agent is present in an amount of 0.1% to 10% w/w of the total composition. According to an embodiment, the spreading agent is present in an amount of 0.1% to 5% w/w of the total composition. According to an embodiment, the spreading agent is present in an amount of 0.10% to 1% w/w of the total composition.

According to an embodiment, the sticking agents which are used in the pesticidal composition include, but not limited to one or more of, silicone-based surfactants, mineral oils, vegetable oils, petroleum oil, silicone oils, emulsifiers, fish oil or fatty acid soaps or emulsified vegetable oil. Carboxymethylcellulose and natural and synthetic polymers such as gum arabic, xanthan gum, guar gum, carrageenan, carbomer, polyvinyl alcohol, polyvinyl pyrrolidone and polyvinyl acetate, lecithins, carboxymethyl cellulose, natural and synthetic polymers, paraffin, a polyamide resin, polyacrylate, polyoxyethylene, wax, polyvinyl alkyl ether, an alkylphenol-formalin condensate, fatty acids, aliphatic alcohols, vegetable oils such as cottonseed, or inorganic oils, petroleum distillates, modified trisiloxanes, polyglycol, polyethers, clathrates, a synthetic resin emulsion or salts or derivatives thereof. However, those skilled in the art will appreciate that it is possible to utilize other conventionally known sticking agents without departing from the scope of the present invention. The sticking agents are commercially manufactured and available through various companies. According to an embodiment, the sticking agent can be present in an amount of 0.1% to 30% w/w of the total composition. According to an embodiment, the sticking agent is present in an amount of 0.1% to 20% w/w of the total composition. According to an embodiment, the sticking agent is present in an amount of 0.10% to 10% w/w of the total composition.

According to an embodiment, the stabilizers which are used in the pesticidal composition include, but not limited to alkyl glyoxylates such as ethyl glyoxylate, zeolite, EDTA and chelating agents, sequestering agents, antioxidants such as sodium bisulphite, sodium metabisulphite, ascorbic acid, ascorbyl palmitate, citric acid, malic acid and their salts; phenol compounds, Vitamin E, BHA, BHT and the like; ultraviolet absorbers such as benzophenone compounds or derivatives thereof. However, those skilled in the art will appreciate that it is possible to utilize other conventionally known stabilizers without departing from the scope of the present invention. The stabilizers are commercially manufactured and available through various companies. According to an embodiment, the stabilizer is present in an amount of 0.1% to 30% w/w of the total composition. According to an embodiment, the stabilizer is present in an amount of 0.1% to 20% w/w of the total composition. According to an embodiment, the stabilizer is present in an amount of 0.1% to 10% w/w of the total composition.

According to an embodiment, the preservatives which are used in the pesticidal composition include but not limited to, one or more of bactericides, anti-fungal agents, biocides, anti-microbial agents, and antioxidant. Non limiting examples of preservatives include one or more of paraben, its esters and salts, propionic acid and its salts, 2,4-hexadienoic acid (sorbic acid) and its salt, formaldehyde and paraformaldehyde, 2-hydroxybiphenyl ether and its salts, inorganic sulfites and bisulfites, sodium iodate, chlorobutanol, 1,6-bis(4-amidino-2-bromophenoxy)-n-hexane and its salts, 5-amino-1,3-bis(2-ethylhexyl)-5-methylhexahydropyrimidine, 5-bromo-5-nitro-1,3-dioxane, 2-bromo-2-nitropropane-1,3-diol, 2,4-dichlorobenzyl alcohol, 5-chloro-2-(2, 4-dichlorobenzylalcohol), N-(4-chlorophenyl)-N'-(3,4-dichlorophenyl) urea, 4-chloro-m-cresol, 2,4,4'-trichloro-2'-hydroxy diphenyl ether, 4-chloro-3,5-dimethyl phenol, 1,1'-methylene-bis(3-(1-hydroxy methyl-2,4-dioximidazolidin-5-yl)urea), 2-phenoxyethanol, hexamethylenetetramine, 1-(3-chloroallyl)-3,5,7-triaza-1-azonia-adamantane chloride, 1(4-chlorophenoxy)-1-(1H-imidazol-1-yl)-3,3-dimethyl-2-butanone, 1,3-bis(hydroxymethyl)-5,5-dimethyl-2, 4-imidazolidinedione, benzyl alcohol, octopirox, 1,2-dibromo-2,4-dicyanobutane, 2,2'-methylenebis(6-bromo-4-chlorophenol), bromochlorophene, dichlorophene, 2-benzyl-4-chlorophenol, 2-chloroacetamide, chlorhexidine, chlorhexidine acetate, chlorhexidine gluconate, chlorhexidine hydrochloride, 1-phenoxypropan-2-ol, N-alkyl (C12-C22)trimethylammonium bromide and chloride, 4,4-dimethyl-1,3-oxazolidine, N-hydroxymethyl-N-(1,3-di (hydroxymethyl)-2,5-dioxoimidazolidin-4-yl)-N'-hydroxymethylurea, 1,6-bis(4-amidinophenoxy)-n-hexane and its salts, glutaraldehyde, 5-ethyl-1-aza-3,7-dioxabicyclo (3.3.0)octane, 3-(4-chlorophenoxy)propane-1,2-diol, Hyamine, alkyl(C8-C18) dimethylbenzyl ammonium chloride, alkyl(C8-C18)dimethylbenzylammonium bromide, alkyl(C8-C18)dimethylbenzylammonium saccharinate, benzyl hemiformal, 3-iodo-2-propynyl butylcarbamate, sodium hydroxymethylaminoacetate, cetyltrimethylammonium bromide, acetic acid, cetylpyridinium chloride, and derivatives of 2H isothiazol-3-one (so-called isothiazolone derivatives) such as alkylisothiazolones (for example 2-methyl-2H-isothiazol-3-one, MIT; chloro-2-methyl-2H-isothiazol-3-one, CIT), benzoisothiazolones (for example 1,2-benzoisothiazol-3(2H)-one, BIT, commercially available as Proxel® types from ICI) or 2-methyl-4,5-trimethylene-2H-isothiazol-3-one (MTIT), C1-C4-alkyl para-hydroxybenzoate, an dichlorophene, Proxel® from ICI or Acticide® RS from Thor Chemie and Kathon® MK from Rohm & Haas, Bacto-100, Sodium Propinoate, Sodium Benzoate, Propyl Paraben, Propyl Paraben Sodium, Potassium Sorbate, Potassium Benzoate, Phenyl Ethyl Alcohol, Sodium, Ethylparaben, Methylparaben, Butylparaben, Bezyla Alcohol, Benzothonium Chloride, Cetylpyridinium Chloride, Benzalkonium Chloride, 1,2-benzothiazol-3-one, Preventol® (Lanxess®), Butylhydroxytoluene, potassium sorbate, iodine-containing organic compounds such as 3-bromo-2,3-diiodo-2-propenyl ethyl carbonate, 3-iodo-2-propynyl butyl carbamate, 2,3,3-triiodo allyl alcohol, and parachlorophenyl-3-iodopropargylformal; benzimidazole compounds and benzthiazole compounds such as 2-(4-thiazolyl)benzimidazole and 2-thiocyanomethylthiobenzo-thiazole; triazole compounds such as 1-(2-(2',4'-dichlorophenyl)-1,3-dioxolane-2-ylmethyl)-1H-1,2,4-triazole, 1-(2-(2',4'-dichloro phenyl)-4-propyl-1,3-dioxolane-2-ylmethyl)-1H-1,2,4-triazole, and α-(2-(4-chlorophenyl) ethyl)-α-(1,1-dimethyl ethyl)-1H-1,2,4-triazole-1-ethanol; and naturally occurring compounds such as 4-isopropyl tropolone (hinokitiol) and borax or salts or derivatives thereof. Antioxidants includes but not limited to one or more of sodium or potassium bisulphites, sulphites, ascorbic acid, isoascorbic acid, imidazole and imidazole derivatives (e.g. urocanic acid), 4,4'-thiobis-6-t-butyl-3-methylphenol, 2,6-di-t-butyl-p-cresol (BHT), and pentaerythrityltetrakis[3-(3,5,-di-t-butyl-4-hydroxyphenyl)] propionate; amine antioxidants such as N,N'-di-2-naphthyl-p-phenylenediamine; hydroquinoline antioxidants such as 2,5-di(t-amyl)hydroquinoline; phosphorus-containing antioxidants such as triphenyl phosphatepropylthiouracil, hydroquinone and derivatives thereof (e.g. arbutin), ubiquinone and ubiquinol, and derivatives thereof, ascorbyl palmitate, stearate, di-palmitate, acetate, Mg ascorbyl phosphates, diso-diumascorbyl phosphate and sulfate, potassium ascorbyltocopheryl phosphate, isoascorbic acid and derivatives thereof, disodium rutinyldisulfate, dibutylhydroxytoluene, 4,4-thiobis-6-tert-butyl-3-methylphenol, butylhydroxy anisole, p-octylphenol, mono-(di- or tri-) methyl benzylphenol, 2,6-tert-butyl-4-methylphenol, pentaerythritol-tetrakis 3-(3, 5-di-tert-butyl-4-hydroxyphenyl)propionate, butyl hydroxyl anisol, trihydroxy butyrophenone, thereof. However, those skilled in the art will appreciate that it is possible to utilize other conventionally known preservatives without departing from the scope of the present invention. The preservatives are commercially manufactured and available through various companies.

According to an embodiment, the preservative or bactericides or anti-fungal agents or biocides or anti-microbial agents or antioxidant is present in an amount of 0.01% to 20% w/w of the total composition. According to further embodiment, the preservative or bactericides or anti-fungal agents or biocides or anti-microbial agents or antioxidant is present in an amount of 0.1% to 10% w/w of the total composition. According to further embodiment, the preservative or bactericides or anti-fungal agents or biocides or anti-microbial agents or antioxidant is present in an amount of 0.1% to 5% w/w of the total composition. According to further embodiment, the preservative or bactericides or anti-fungal agents or biocides or anti-microbial agents or antioxidant is present in an amount of 0.1% to 2% w/w of the total composition.

According to an embodiment, the structuring agents which are used in the pesticidal composition include, but not limited to one or more of thickeners, viscosity modifiers, tackifiers, suspension aids, rheological modifiers or anti-settling agents. A structuring agent prevents sedimentation of the active ingredient particles after prolonged storage.

According to an embodiment, the structuring agents which are used in the composition include, but not limited to one or more polymers such as polyacrylics, polyacrylamides, polysaccharides, modified cellulose derivatives, co-polymers of cellulose derivatives, carboxyvinyl or polyvinyl pyrrolidones, polyethylenes, polyethylene oxide, polyvinyl alcohol and derivatives; clays such as bentonite clays, kaolin, smectite, attapulgites, attaclays, veegum, vangel with high surface area, silica and natural gums such as guar gum, xanthan gum, gum Arabic, gum tragacanth, rhamsan gum, locust bean gum, carrageenan, welan gum, dextrin, polyacrylic acids and their sodium salts; fumed silica, mixture of fumed silica and fumed aluminium oxide, swellable polymers, swelling clay, polyamides or its derivatives; polyols such as poly(vinyl acetate), sodium polyacrylate, poly(ethylene glycol), phospholipid (for example, cephalin, and the like); stachyose, fructo-oligosaccharides, amylose, pectins, alginates, hydrocolloids and mixtures thereof. Also, celluloses such as, carboxymethylcellulose, ethylcellulose, hydroxyethylcellulose, hydroxy-methyl ethyl cellulose, hydroxyl ethyl propyl cellulose, methylhydroxyethylcellulose, methylcellulose, starches, starch acetates, starch hydroxyethyl ethers, ionic starches, long-chain alkyl starches, dextrins, maltodextrin, corn starch, amine starches, phosphates starches, and dialdehyde starches, plant starches such as corn starch and potato starch; other carbohydrates such as pectin, amylopectin, xylan, glycogen, agar, gluten, alginic acid, phycocolloids, or derivatives thereof. However, those skilled in the art will appreciate that it is possible to utilize other conventionally known structuring agents without departing from the scope of the present invention.

Preferred structuring agents include one or more of xanthan gum, aluminum silicate, methylcellulose, polysaccharide, alkaline earth metal silicate, guar gum, veegum, bentonite, attapulgite and kaolin. The structuring agents are commercially manufactured and available through various companies.

According to an embodiment, the structuring agent is present in an amount of 0.010% to 5% w/w of the composition. According to an embodiment, the structuring agent is present in an amount of 0.01% to 4% w/w of the composition. According to an embodiment, the structuring agent is present in an amount of 0.01% to 3% w/w of the composition. According to an embodiment, the structuring agent is present in an amount of 0.01% to 2% w/w of the composition. According to an embodiment, the structuring agent is present in an amount of 0.01% to 1% w/w of the composition. According to an embodiment, the structuring agent is present in an amount of 0.01% to 0.1% w/w of the composition.

According to an embodiment, the antifreezing agents or freezing point depressants used in the liquid suspension composition include, but are not limited to one or more of polyhydric alcohols such as ethylene glycol, diethylene glycol, dipropylene glycol, propylene glycol, glycerol, monohydric or polyhydric alcohols, glycol ethers, glycol monoethers such as the methyl, ethyl, propyl and butyl ether of ethylene glycol, diethylene glycol, propylene glycol and dipropylene glycol, glycol diethers such as methyl and ethyl diethers of ethylene glycol, diethylene glycol and dipropyleneglycol urea, glycerol, isopropanol, propylene glycol monomethyl ether, di- or tripropylene glycol monomethyl ether or carbohydrates such as glucose, mannose, fructose, galactose, sucrose, lactose, maltose, xylose, arabinose, sorbitol, mannitol, trehalose, raffinose or derivatives thereof. However, those skilled in the art will appreciate that it is possible to utilize different antifreezing agents without departing from the scope of the present invention. The antifreezing agents are commercially manufactured and available through various companies.

According to an embodiment, the chelating or complexing or sequestering agents which are used in the pesticidal composition include, but not limited to one or more of lignosulphonates, polycarboxylic acids such as polyacrylic acid and the various hydrolyzed poly(methyl vinyl ether/maleic anhydride); N-hydroxyethyliminodiacetic acid, nitrilotriacetic acid (NTA), N,N,N',N'-ethylenediaminetetraacetic acid, N-hydroxyethyl-N, N',N'-ethylenediaminetriacetic acid and N,N,N',N'',N''-diethylenetriaminepentaacetic acid; α-hydroxy acids, such as citric acid, tartaric acid and gluconic acid; orthophosphates, such as trisodium phosphate, disodium phosphate, monosodium phosphate; condensed phosphates, such as sodium tripolyphosphate, tetrasodium pyrophosphate, sodium hexametaphosphate and sodium tetrapolyphosphate; 5-sulfo-8-hydroxyquinoline; and 3,5-disulfopyrocatechol, polycarboxylates, ethylene diamine tetraacetic acid (EDTA) and its salts, diethylenetriaminepentaacetic acid (DTPA) and its salts, N-hydroxyethyl-ethylenediamine-triacetic acid (HEDTA) and its salts, ethylenediaminediacetate (EDDA) and its salts, ethylenediaminedi(o-hydroxyphenylacetic) acid (EDDHA) and its salts, cyclohexane diamine tetraacetic acid (CDTA) and its salts, polyethyleneaminepolyacetic acids, lignosulfonate, Ca—, K—, Na—, and ammonium lignosulfonates, fulvic acid, ulmic acid, citric acids, cyclodextrin, phytic acid, humic acid, pyrophosphate. However, those skilled in the art will appreciate that it is possible to utilize other chelating or complexing or sequestering agents without departing from the scope of the present invention. The chelating or complexing or sequestering agents are commercially manufactured and available through various companies.

According to an embodiment, the penetrant which is used in the pesticidal composition include, but not limited to one or more of alcohol, glycol, glycol ether, ester, amine, alkanolamine, amine oxide, quaternary ammonium compound, triglyceride, polyoxyethylenetrimethylolpropane hexaoleate, sorbitan monooleate, polyoxyethylene sorbitan monolaurate, polyoxyethylene trimethylolpropane trioleate, ethoxylated triglycerides, ethoxylated polyol esters, alkoxylated alkanols and also alkoxylated triglycerides fatty acid ester, fatty acid ether, N-methyl pyrrolidone, dimethylformamide, dimethylacetamide, or dimethyl sulfoxide, polyoxyethylene trimethylol propane monooleate, polyoxyethylene trimethylol propanedioleate, polyoxyethylene trimethylol propanetrioleate, polyoxyethylene sorbitan monooleate, polyoxyethylene sorbitol hexaoleate. However, those skilled in the art will appreciate that it is possible to utilize different penetrants without departing from the scope of the present invention. The penetrants are commercially manufactured and available through various companies.

According to an embodiment, the ultraviolet absorbent agent is selected from, but not limited to one or more of zinc oxide, titanium oxide, lignosulphonates, 2-(2'-hydroxy-5'-methylphenyl) benzotriazole, 2-ethoxy-2'-ethyloxazalic acid bisanilide, succinic acid dimethyl-1-(2-hydroxyethyl)-4-hydroxy-2,2,6,6-tetramethylpiperidine polycondensate, benzotriazole compounds such as 2-(2'-hydroxy-5'-methylphenyl) benzotriazole and 2-(2'-hydroxy-4'-n-octoxyphenyl) benzotriazole; benzophenone compounds such as 2-hydroxy-4-methoxybenzophenone and 2-hydroxy-4-n-octoxybenzophenone; salicylic acid compounds such as phenyl salicylate and p-t-butylphenyl salicylate; 2-ethylhexyl 2-cyano-3,3-diphenyl acrylate, 2-ethoxy-2'-ethyl oxalic bisanilide, p-aminobenzoic acid and its salts or derivatives; and dimethyl succinate-1-(2-hydroxyethyl)-4-hydroxy-2,2, 6,6-tetramethylpiperidine polycondensate or derivatives or the like. However, those skilled in the art will appreciate that it is possible to utilize different ultraviolet absorbents, without departing from the scope of the present invention. Such ultraviolet absorbents are commercially manufactured and available through various companies.

According to an embodiment, the UV ray scattering agents include, but not limited to zinc oxide, titanium dioxide or the like may be used. However, those skilled in the art will appreciate that it is possible to utilize different UV ray scattering agents or mixtures thereof without departing from the scope of the present invention. Such UV ray scattering agents are commercially manufactured and available through various companies.

According to an embodiment, the humectant is selected from, but not limited to one or more of polyoxyethylene/polyoxypropylene copolymers, particularly block copolymers, such as the Synperonic PE series of copolymers available from Uniqema or salts, derivatives thereof. Other humectants are propylene glycol, monoethylene glycol, hexylene glycol, butylene glycol, ethylene glycol, diethylene glycol, poly (ethylene glycol), poly (propylene glycol), glycerol and the like; polyhydric alcohol compounds such as propylene glycol ether, derivatives thereof. Also, other humectants include calcium chloride, sodium lactate, urea, polydextrose, sodium metaphosphate, amino acids such as proline; triacetin, etc. The non-ionic surfactants mentioned above also act as humectants. However, those skilled in the art will appreciate that it is possible to utilize other conventionally known humectants without departing from the scope of the present invention. The humectants are commercially manufactured and available through various companies.

According to an embodiment, the humectant is present in the range of 0.1% to 50% w/w of the total composition. According to an embodiment, the humectant is present in the range of 0.10% to 30% w/w of the total composition.

According to an embodiment, the humectant is present in the range of 0.1% to 10% w/w of the total composition.

According to an embodiment, the ZC compositions or the water dispersible granules of capsulated suspension include monomers which include at least one first monomer employed in the organic phase which include isocyanates such as polymethylenepolyphenyleneisocyanate (PMPPI), hexamethylenediisocyanate (HMDI), isophoronediisocyanate (IPDI) or 4,4' methylenebis(cyclohexyl isocyanate) and/or trimers of HMDI or IPDI and the like, isomers of toluene diisocyanate, isomers and derivatives of phenylene diisocyanate, isomers and derivatives of biphenylene diisocyanates, methylene diphenyl diisocyanate (MDI), polymeric polyisocyanates, biurets and blocked polyisocyanates or mixtures thereof.

The concentration of the isocyanate(s) and the ratio where more than one isocyanate is used, is chosen so as to obtain the desired release rate profile for the particular application. In general, the isocyanate(s) will comprise from about 0.3 to about 20%, more suitably from about 0.5 to about 15%, even more suitably from about 1% to about 25% and most suitably from about 10% to about 20%, by weight of the microcapsule.

According to an embodiment, the ZC compositions or the water dispersible granules of capsulated suspension includes at least one second monomer such as diamines or polyamines or mixtures thereof. The monomers include compounds which are soluble in the aqueous phase. Aliphatic or alicyclic primary or secondary diamines or polyamines such as ethylene-1,2-diamine, diethylenetriamine, triethylenetetramine, bis-(3-aminopropyl)-amine, bis-(2-methylaminoethyl)-methylamine, 1,4-diaminocyclohexane, 3-amino-1-methylaminopropane, N-methyl-bis-(3-aminopropyl)amine, 1,4-diamino-n-butane, propylene 1,3-diamine, tetramethylene diamine, pentamethylene diamine, 1,6-hexamethylene diamine, triethylene diamine, 1,6-diamino-n-hexane and tetraethylenepentamine and mixtures thereof are suitably used. Polyethyleneimines are also suitable. Diamines and polyamines, usually selected as water soluble per se or in-water soluble salt form, are polymethylene diamines, phenylene diamine, toluene diamine and piperazine.

Particularly suitable amines are polyfunctional amines which have a functionality greater than 2 but less than 3 and which may provide a degree of cross-linking in the shell wall. The polyfunctional amines should be in a water-soluble salt form. Suitable examples of polyfunctional amines which may be used include 1,3,5-benzene triamine trihydrochloride, 2,4,6-triamino toluene trihydrochloride, 1,3,6-triaminonaphthalene, 3,4,5-triamino-1,2,4-triazole, melamine, 2,4,5,8-tetramino anthraquinone, propylenediamine, isopropylenediamine, ethenediamine, triethylenetetraamine, bix-hexamethylenetriamine, polyalkylene polyamines such as pentaethylene hexamine, and the like. The amines may be used alone or in combination with each other, preferably in combination with 1,6-hexamethylenediamine (HMDA).

According to an embodiment, the ZC compositions or the water dispersible granules of capsulated suspension include protective colloids selected from at least one of polyvinyl alcohols, polyvinyl acetals, polyvinyl pyrrolidones, water-soluble polysaccharides such starches (amylose and amylopectin), celluloses and their methyl, hydroxyethyl and hydroxypropyl derivatives, and poly (meth) acryls. Polyvinyl alcohol is usually sold in a solid form with wide variations in molecular weight and degree of hydrolysis. The polyvinyl alcohol is added in an amount sufficient to enhance the stability of the microcapsules. Particularly, polyvinyl alcohol of lower molecular weight or lesser degree of hydrolysis, which are more water-soluble, are preferred.

According to an embodiment, the ZC compositions or the water dispersible granules of capsulated suspension include polymers such as polyurea formed by reaction of a polyisocyanate with a polyamine; polymers formed from melamine formaldehyde or urea formaldehyde condensates as well as similar types of aminoplasts, polyurethane, polyamide, polyolefin, polysaccharides, proteins, silica, lipid modified cellulose, gums, polyacrylates, polyphosphates, polystyrenes, polyesters or mixtures thereof.

According to an embodiment, the pesticidal composition includes at least one further active ingredient. According to an embodiment, the active ingredient includes at least one pesticidal active; nutrients selected from macronutrients, micro nutrients; bio stimulants; fertilizers; plant growth regulators; algae and mixtures thereof. However, those skilled in the art will appreciate that it is possible to utilize other active ingredient without departing from the scope of the present invention.

According to an embodiment, the pesticidal actives include one or more of an antifoulant, an insecticide, a fungicide, a herbicide, a nematicide, a pheromone, a defoliant, an acaricide, a plant growth regulator, an algicide, an antifeedant, an avicide, a bactericide, a bird repellent, a biopesticide, a biocide, a chemosterilant, a safener, an insect attractant, an insect repellent, an insect growth regulator, a mammal repellent, a mating disrupter, a disinfectant, a molluscicide, an antimicrobial, a miticide, an ovicide, a fumigant, a plant activator, a rodenticide, a synergist, a virucide, a microbial pesticide, a plant incorporated protectant, other miscellaneous pesticidal actives or salts or derivatives and mixtures thereof. However, those skilled in the art will appreciate that it is possible to utilize other pesticidal actives without departing from the scope of the present invention.

According to further embodiment, the further active ingredient is present in the concentration range of 0.1% w/w to 75% w/w of the total composition. According to further embodiment, the active ingredient can be present in the concentration range of 0.1% w/w to 70% w/w of the total composition. According to further embodiment, the active ingredient can be present in the concentration range of 0.10% w/w to 50% w/w of the total composition. According to further embodiment, the active ingredient can be present in the concentration range of 0.1% w/w to 30% w/w of the total composition. According to further embodiment, the active ingredient can be present in the concentration range of 0.1% w/w to 10% w/w of the total composition.

It has been surprisingly found that the pesticidal composition of the present invention has improved physical properties of dispersibility, suspensibility, wettability, viscosity, pourability which provides ease of handling and also reduces the loss of material while handling the product at the time of packaging as well as during field application.

According to an embodiment, viscosity of the liquid composition is determined as per CIPAC MT-192. According to an embodiment, the pesticidal composition has a viscosity at 25° C. of about 10 cps to about 3000 cps. According to an embodiment, the pesticidal composition has a viscosity at 25° C. of about 10 cps to about 2500 cps. According to an embodiment, the pesticidal composition has a viscosity at 25° C. of about 10 cps to about 2000 cps. According to an embodiment, the pesticidal composition has a viscosity at 25° C. of about 10 cps to about 1500 cps. According to an embodiment, the pesticidal composition has a viscosity at 25° C. of about 10 cps to about 1200 cps. According to an embodiment, the pesticidal composition has a viscosity at 25° C. of about 10 cps to about 1000 cps. According to an embodiment, the pesticidal composition has a viscosity at 25° C. of about 10 cps to about 800 cps. According to an embodiment, the pesticidal composition has a viscosity at 25° C. of about 10 cps to about 500 cps. According to an embodiment, the pesticidal composition has a viscosity at 25° C. of about 10 cps to about 400 cps. According to an embodiment, the pesticidal composition has a viscosity at 25° C. of about 10 cps to about 300 cps.

According to an embodiment, the liquid suspension composition of the present invention is easily pourable. The pourability is the measure of percent of residue.

According to an embodiment, the pourability of the pesticidal composition is determined as per CIPAC MT-148.1. According to a further embodiment, the pourability of the pesticidal composition is less than 5% residue. According to further embodiment, the pourability of the pesticidal composition is preferably less than 2.5% residue. According to further embodiment, the pourability of the pesticidal composition is more preferably less than 2.0% residue.

Dispersibility of the composition of the present application, can determined as per the standard CIPAC test, MT 174. According to an embodiment, the pesticidal composition has a dispersibility of at least 50%. According to an embodiment, the pesticidal composition has a dispersibility of at least 60%. According to an embodiment, the pesticidal composition has a dispersibility of at least 70%. According to an embodiment, the pesticidal composition has a dispersibility of at least 80%. According to an embodiment, the pesticidal composition has a dispersibility of at least 90%. According to an embodiment, the pesticidal composition has a dispersibility of at least 99%. According to an embodiment, the pesticidal composition has a dispersibility of 100%.

Suspensibility is defined as the amount of active ingredient suspended after a given time in a column of liquid, of stated height, expressed as a percentage of the amount of active ingredient in the original suspension. The test for suspensibility is done as per the CIPAC Handbook, "MT 184 Test for Suspensibility".

According to an embodiment, the pesticidal composition has a suspensibility of at least 50%. According to an embodiment, the pesticidal composition has a suspensibility of at least 60%. According to an embodiment, the pesticidal composition has a suspensibility of at least 70%. According to an embodiment, the pesticidal composition has a suspensibility of at least 80%. According to an embodiment, the pesticidal composition has a suspensibility of at least 90%. According to an embodiment, the pesticidal composition has a suspensibility of at least 99%. According to an embodiment, the pesticidal composition has a suspensibility of 100%.

According to an embodiment, the pesticidal composition demonstrates superior suspensibility under accelerated storage condition (ATS). According to an embodiment, the pesticidal composition demonstrates suspensibility of at least 90% under ATS. According to an embodiment, the pesticidal composition demonstrates suspensibility of at least 80% under ATS. According to an embodiment, the pesticidal composition demonstrates suspensibility of at least 70% under ATS. According to an embodiment, the pesticidal composition demonstrates suspensibility of at least 60% under ATS. According to an embodiment, the pesticidal composition demonstrates suspensibility of at least 50% under ATS. According to an embodiment, the pesticidal composition demonstrates suspensibility of at least 40% under ATS.

According to an embodiment, the pesticidal composition demonstrates dispersibility of at least 90% under ATS. According to an embodiment, the pesticidal composition demonstrates a dispersibility of at least 80% under ATS. According to an embodiment, the pesticidal composition demonstrates dispersibility of at least 70% under ATS. According to an embodiment, the pesticidal composition demonstrates dispersibility of at least 60% under ATS. According to an embodiment, the pesticidal composition demonstrates dispersibility of at least 50% under ATS. According to an embodiment, the pesticidal composition demonstrates dispersibility of at least 40% under ATS.

Wettability is the condition or the state of being wettable and can be defined as the degree to which a solid is wetted by a liquid, measured by the force of adhesion between the solid and liquid phases. The wettability of the granular composition or wettable powder compositions is measured using the Standard CIPAC Test MT-53 which describes a procedure for the determination of the time of complete wetting of wettable formulations. A weighed amount of the granular composition is dropped on water in a beaker from a specified height and the time for complete wetting was determined. According to another embodiment, the pesticidal composition in the form of water dispersible granules, wettable powders, spheronised granule or broadcast granules has wettability of less than 2 minutes. According to another embodiment, the wettability of less than 1 minute. According to another embodiment, the pesticidal composition has wettability of less than 30 seconds.

According to an embodiment, the pesticidal composition demonstrates superior stability towards heat, light, temperature and caking. According to an embodiment, the stability exhibited by the pesticidal composition is at least 3 years. According to further embodiment, the stability exhibited by the pesticidal composition is at least 2 years. According to further embodiment, the stability exhibited by the pesticidal composition is at least 1 year. According to further embodiment, the stability exhibited by the pesticidal composition is at least 6 months.

According to an embodiment, the present invention relates to a process of preparing the pesticidal composition of the present invention comprising elemental sulphur present in the range of 20% w/w to 90% w/w of the total composition; fluensulfone or salts or derivatives thereof in the range of 0.1% w/w to 30% w/w of the total composition and at least one agrochemically acceptable excipient.

According to another embodiment, the pesticidal composition in the form of water dispersible granules, is prepared by various techniques such as spray drying, fluidized bed granulation, spheronizer, freeze drying etc. The granules can also be extruded through the extruder to obtain extruded granules.

According to an embodiment, the process of preparing a water dispersible granular composition involves obtaining a blend of elemental sulphur and fluensulfone and salts, derivatives or mixtures thereof; with at least one agrochemical excipient to obtain slurry or a wet mix. The wet slurry is milled to get the desired particle size of 0.1 to 30 microns. The wet mix obtained is then dried, for instance in a spray dryer, fluid bed dryer or any suitable granulating equipment, followed by sieving to remove the undersized and oversized granules to obtain water dispersible granules of the desired size if required. However, those skilled in the art will appreciate that it is possible to modify or alter or change the process or process parameters to obtain water dispersible granular composition without departing from the scope of the present invention.

According to another embodiment, the invention relates to a process for preparing an extruded granular composition. The process involves passing sulphur technical through an air jet mill to obtain a particle size in the range of 0.1 to 30 microns. The process further involves taking water in a beaker and adding the surfactants to it. The process further involves adding fluensulfone to the above mixture and mixing using a homogenizer to get a uniform dispersion. The milled dispersion of sulphur and fluensulfone is further granulated and water is added to get a mass of the desired consistency. The mass is then passed through an extruder to get an extrudate and dried to obtain the extruded water dispersible granular composition.

According to another embodiment, the invention relates to a process for preparing a wettable powder composition. The process involves mixing effective amount of fluensulfone, salts or derivatives thereof with required diluents and inert ingredients to obtain a first mixture. Elemental sulphur is then mixed with the surfactants to obtain a second mixture. Both the mixtures are then added to a mass mixer for 30 minutes and passed through an air jet mill to obtain a wettable powder composition with the desired particle size range of 0.1 micron to 60 microns.

According to another embodiment, the invention relates to a process for preparing the water dispersible granules of capsulated suspension. The process involves initially preparing a slurry of sulphur in water using the required surfactants and milling it using a suitable mill to get desired particle size in the range of 0.1 to 30 microns. Then to prepare a capsulated suspension composition, fluensulfone is dissolved in a suitable oil. Further a solution of polyvinyl alcohol is prepared in water. Thereafter, diisocyanate is added to the oil phase and the oil phase is added dropwise to the solution of polyvinyl alcohol in water at 45 degrees C. to 55 degrees C. Ethylenediamine is then dissolved in water followed by addition of an acid. The pH is then adjusted to 6.0-7.5 using a suitable alkali. The milled slurry of sulphur and the capsulated suspension of fluensulfone is mixed in the required proportion and the mixture is spray dried to obtain the water dispersible granules of capsulated suspension.

According to another embodiment, the invention relates to a process for preparing the liquid suspension composition.

According to an embodiment, the invention relates to a process of preparation of the liquid suspension pesticidal composition, the process involving: homogenizing mixture of effective amount of elemental sulphur, fluensulfone and salts, derivatives or mixtures thereof, and at least one agrochemically acceptable excipient to obtain a suspension; and wet milling the obtained suspension to obtain composition with a particle size range of 0.1 micron to 30 microns.

According to an embodiment, the process of preparing the liquid suspension composition, involves homogenization of one or more of excipients by feeding them into a vessel provided with stirring facilities. Further, elemental sulphur, fluensulfone and salts, derivatives or mixtures thereof are added to the homogenized blend and stirred continuously for about 5 to 10 minutes, until the total mixture becomes homogeneous. Subsequently, the suspension obtained is passed through the wet mill to obtain a desired particle size in the range of 0.1 to 30 microns. Then, requisite quantity of the structuring agent is added to the obtained suspension, under continuous homogenization. However, those skilled in the art will appreciate that it is possible to modify or alter or change the process or process parameters to obtain liquid suspension composition without departing from the scope of the present invention.

According to an embodiment, the invention relates to a process of preparation of a suspoemulsion pesticidal composition, the process comprising dissolving fluensulfone in an oil or a solvent and preparing a concentrated emulsion with required agrochemical excipients to obtain a first fraction. The process further comprises mixing effective amount of elemental sulphur with the surfactants to obtain a second fraction which is then milled to get the desired particle size. The two fractions obtained are then mixed in a mass mixer for 30 minutes to obtain the suspoemulsion composition with the desired particle size of 0.1 to 30 microns.

According to another embodiment, the invention relates to a process for preparing the ZC composition (combination of a suspension concentrate and capsulated suspension composition). The process involves preparing a slurry by taking water in a beaker and adding the requisite surfactants, glycols and biocides. Further sulphur is added to the mixture and the mixture is milled to achieve the desired particle size. For preparing the capsulated suspension, effective amount of fluensulfone is mixed with the solvent or oil. A solution of polyvinyl alcohol is prepared in water. Then requisite quantity of diisocyanate is added to the oil phase and the oil phase is added dropwise to the PVA solution in water at 45 degrees C. to 55 degrees C. Furthermore, ethylene diamine is added and dissolved in water followed by addition of an acid. The pH is then adjusted to 6.0-7.5 using a suitable alkali. The fluensulfone capsulated suspension is then added to the sulphur suspension and mixed well to obtain the ZC composition. The structuring agent is then added along with additional water, if necessary to make up the volume. The composition has a particle size range of 0.1 to 30 microns.

According to an embodiment, the invention further relates to a method of application of the composition. The composition is applied through a variety of methods, which ensure that the composition penetrates the soil. The composition is applied through nursery tray application, in furrow application, soil drenching, soil injection, drip irrigation, sprinkler irrigation, seed treatment, seed painting and such other methods. The composition is also applied in the form of a foliar spray.

According to an embodiment, the invention also relates to a method of protecting the crop, controlling insect pests, nematodes and fungi; improving crop health and growth; enhancing the crop yield; strengthening the plant; increasing crop defense; the method comprising treating at least one of a plant, crop, plant propagation material, locus or parts thereof, a seed, seedling or surrounding soil with the pesticidal composition which includes elemental sulphur present in the range of 20% w/w to 90% w/w of the total composition, fluensulfone or salts or derivatives thereof in the range of 0.1% w/w to 30% w/w of the total composition. The composition may be sprayed directly to the plant, such as its foliage or applied to the plant propagation material, before it is sown or planted, or to the locus thereof.

The rates of application or the dosage of the composition depends on the type of crops, or the specific active ingredients in the composition but is such that the pesticidal active ingredient, is in an effective amount to provide the desired action such as crop protection, crop yield.

It was observed that the composition of the present invention provides good control on insect pest as compared to application of individual actives. Further such composition helps in improving the crop yield as well as in enhancing the crop physiological characteristics etc. Thus, it has been observed that the compositions of the present invention, demonstrate enhanced, efficacious and superior behavior in the fields at reduced dosage.

A. PREPARATION EXAMPLES

The following examples illustrate the basic methodology and versatility of the composition of the invention. It should be noted that this invention is not limited to these exemplifications and can be extrapolated to overall claimed concentration range of the components.

Example 1: Wettable Powder Formulation of 85% Elemental Sulphur and 1% Fluensulfone Wettable powder formulation was prepared by mixing 1 part of fluensulfone with 1 part of precipitated silica and 4 parts of Kaolin to obtain a first fraction. Further 85 parts of sulphur were mixed with 7 parts of sodium lignosulphonate and 2 parts of Naphthalene sulphonate condensate to obtain a second fraction. Both the fractions were then blended in a mass mixer for 30 minutes and then passed through an air jet mill to get the wettable powder composition with desired particle size.

The composition had the particle size of about 59 microns. The composition had a suspensibility of 53%, wet sieve retention value of 0.04% and wettability of less than 35 seconds. The composition further demonstrated suspensibility of about 47% and wettability of about 40 seconds under accelerated storage condition.

Example 2: Wettable Powder Formulation of 20% Elemental Sulphur and 20% Fluensulfone Wettable powder formulation was prepared by mixing 20 parts of fluensulfone with 4 parts of alcohol ethoxylate, 20 parts of silica and 20 parts of china clay to obtain a first fraction. Further 20 parts of sulphur and 10 parts of zinc oxide were mixed with 3 parts of Supragil MNS 90, and 3 parts of Supragil WP to obtain a second fraction. Both the fractions were then mixed in a mass mixer for 30 minutes and then passed through an airjet mill to get the desired particle size.

The composition had the particle size of about 35 microns. The composition has a suspensibility of 60%, wettability of less than 10 seconds and wet sieve retention value of 0.10%. The composition further demonstrated wettability of 15 seconds and suspensibility of about 57% under accelerated storage condition.

Example 3: Wettable Powder Formulation of 45% Elemental Sulphur and 30% Fluensulfone Wettable powder formulation was prepared by mixing 30 parts of fluensulfone with 3 parts of alcohol ethoxylate, 17 parts of silica and 2 parts of China clay to obtain a first fraction. 45 parts of sulphur were then mixed with 2 parts of Geropon T36 and 1 part of Geropon T77 to obtain a second fraction. Both the fractions were blended in a mass mixer for 30 minutes and then passed through an airjet mill to get the desired particle size.

The composition had the particle size of about 26 microns. The composition has a, suspensibility of 62%, wettability of less than 60 sec and wet sieve retention 0.12%.

The composition further demonstrated wettability of less than 55 seconds and suspensibility of about 55% under accelerated storage condition.

Example 4: Wettable Powder Formulation of 90% Elemental Sulphur and 0.1% Fluensulfone Wettable powder formulation was prepared by mixing 0.1 part of fluensulfone with 4 parts of Kaolin. Further 90 parts of sulphur were mixed with 3.9 parts of sodium ligninsulphonate and 2 parts of Naphthalene sulphonate condensate. Both the fractions were then blended in a mass mixer for 30 minutes and then passed through an air jet mill to get the desired particle size.

The composition had the particle size of about 43 microns. The composition had a, suspensibility of 67%, wet sieve retention value of 0.08% and wettability of less than 30 seconds. The composition further demonstrated suspensibility of about 60% and wettability of 25 seconds under accelerated storage condition.

Example 5: Water Dispersible Granule of Elemental Sulphur 88% and 2% of Fluensulfone Water dispersible granules were prepared by taking water in a beaker and surfactants including 1 part of naphthalenesulfonate condensate sodium salt, 4 parts of Stepsperse 500, 1 part of silica and 4 parts of Tensiofix LX were added to the beaker one after the other and stirred till the surfactants dissolved completely. Further 88 parts of sulphur technical was added and stirred to disperse well. Thereafter 2 parts of fluensulfone technical was added and mixed using a homogenizer for 15 minutes to obtain a slurry. The slurry was then passed through a wet mill to obtain the desired particle size range. The milled slurry was then spray dried using a suitable spray drying equipment. The composition had the particle size of about 20 microns and granule size of 2.5 mm.

The composition has a dispersibility of 81%, suspensibility of 71%, wettability of less than 30 seconds and wet sieve retention value of 0.09%. The composition further demonstrated dispersibility of 78%, wettability of less than 25 seconds and suspensibility of about 68% under accelerated storage condition. The composition does not exhibit any hardness.

Example 6: Water Dispersible Granule of Elemental Sulphur 20% and 10% of Fluensulfone Water dispersible granules were prepared by taking water in a beaker and surfactants including 1 parts of naphthalenesulfonate condensate sodium salt, 4 parts of Stersperse 200, 5 parts of Vanillex N, 5 parts of silica and 50 parts of china clay were added to the beaker one after the other and stirred till the surfactants dissolved completely. Further 20 parts of sulphur technical and 5 parts of azoxystrobin were added and stirred to disperse well. Thereafter 10 parts of fluensulfone technical was added and mixed using a homogenizer for 15 minutes to obtain a slurry. The slurry was then passed through a wet mill to obtain the desired particle size range. The milled slurry was then spray dried using a suitable spray drier.

The composition had the particle size of about 5 microns and granule size of 1.2 mm. The composition has a dispersibility of 92%, suspensibility of 88%, wettability of less than 20 sec and wet sieve retention value of 0.07%. The composition further demonstrated dispersibility of 87%, wettability of less than 15 seconds and suspensibility of about 82% under accelerated storage condition. The composition does not exhibit any hardness.

Example 7: Water Dispersible Granule of Elemental Sulphur 50% and 0.1% of Fluensulfone Water dispersible granules were prepared by taking water in a beaker and adding surfactants including 1 part of Borresperse CA, 3 parts of polycarboxylate sodium and 6 parts of maltodextrin along with 34.9 parts of china clay were added to the beaker one after the other and stirred till the surfactants dissolved completely. Further 50 parts of sulphur technical and 5 parts of spirulina were added and stirred to disperse well. Thereafter 0.1 part of fluensulfone technical was added and mixed using a homogenizer for 15 minutes to obtain a slurry. The slurry was then passed through a wet mill to obtain the desired particle size range. The milled slurry was then spray dried using a suitable spray drier.

The composition had the particle size of about 28 microns and granule size of 2.0 mm. The composition has a dispersibility of 74%, suspensibility of 65%, wettability of less than 9 sec and wet sieve retention value of 0.1%. The composition further demonstrated dispersibility of 70%, wettability of less than 5 seconds and suspensibility of about 60% under accelerated storage condition. The composition does not exhibit any hardness.

Example 8: Liquid Suspension Composition of 60% Elemental Sulphur and 0.1% Fluensulfone Liquid suspension composition was prepared by taking water (quantity sufficient) in a beaker and adding surfactants such as 2 parts of Resicare MSW, 2 parts of Soprophor FL along with 5 parts of Monoethylene glycol, 4.6 parts of alcohol ethoxylate, 0.1 part of benzisothiazolinone. The components were mixed well to obtain a mixture and 60 parts of elemental sulphur and 0.1 part of fluensulphone technical were added to the mixture. The resulting mixture was stirred well and milled to get desired particle size. Then, 0.07 parts of xanthan gum was added under continuous homogenization to obtain the suspension concentrate.

The resulting formulation had a particle size of 3 microns, suspensibility of 88% and wet sieve retention of 0.01%. The pH of the suspension concentrate was 5.5. The composition has a viscosity of about 400 cps, pourability of less than 3.5% residue. The composition has suspensibility of about 80% and viscosity of about 360 cps under accelerated storage condition.

Example 9: Liquid Suspension Composition of 30% Elemental Sulphur and 1% Fluensulfone Liquid suspension composition was prepared by taking water (quantity sufficient) in a beaker and adding surfactants such as 2 parts of dioctyl sulfosuccinate sodium, 1.8 parts of naphthalene sulphonate condensate along with 5 parts of Monoethylene glycol, 2 parts of Soprophor 3D33 and 0.1 part of benzisothiazolinone. The components were mixed well to obtain a mixture and 30 parts of elemental sulphur and 1 part of fluensulphone technical were added to the mixture. The resulting mixture was stirred well and milled to get desired particle size. Then, 0.1 part of xanthan gum was added under continuous homogenization to obtain the suspension concentrate.

The resulting formulation had a particle size of 14 microns, suspensibility of 99% and wet sieve retention of 0.03%. The pH of the suspension concentrate was 7.1. The composition has a suspensibility of about 99%, viscosity of about 350 cps and a pourability of less than 1% residue. The composition has suspensibility of about 95%, and viscosity of about 320 cps under accelerated storage condition.

Example 10: Liquid Suspension Composition of 20% Elemental Sulphur and 5% Fluensulfone Liquid suspension composition was prepared by taking water (quantity sufficient) in a beaker and adding surfactants such as 2 parts of polysorbate 20, 2 parts of Morwet D425 along with 10 parts of propylene glycol, 1.5 parts of Tersperse 2500 and 0.1 part of benzisothiazolinone. The components were mixed well to obtain a mixture and 20 parts of elemental sulphur along with 5 parts of fluensulphone technical were added to the mixture. The resulting mixture was stirred well and milled to get desired particle size. Then, 0.08 part of xanthan gum was added under continuous homogenization to obtain the suspension concentrate.

The resulting formulation had a particle size of 9.6 microns, suspensibility of 90% and wet sieve retention of 0.04%. The pH of the suspension concentrate was 6.8 The composition has a viscosity of about 800 cps and a pourability of less than 2% residue. The composition has suspensibility of about 84%, and viscosity of about 810 cps under accelerated storage condition.

Example 11: Suspoemulsion Composition of 20% Elemental Sulphur and 15% Fluensulfone To a sufficient quantity of water in a beaker, 5 parts of monoethylene glycol followed by 5 parts of Soprophor 3D33, 2 parts of polysorbate 85 and 0.1 part Benzisothiazolinone was added to obtain a mixture. 20 parts of sulphur was then added to the mixture and the suspension obtained was uniformly mixed using a homogenizer and then passed through a wet mill to get the desired particle size range. 15 parts of fluensulfone was then dissolved in 5 parts of Solvesso 100 and 1.5 parts of calcium salt of alkylbenzene sulfonate was then added to the mixture. The Fluensulfone mixture was then added to the milled sulphur suspension. Further 0.12 parts of xanthan gum was added to get the desired viscosity.

The composition has particle size of about 17 microns, suspensibility of about 81%, viscosity of about 420 cps, and pourability of less than 1.5%, wet sieve retention of 0.01%. The composition has suspensibility of about 78%, and viscosity of about 370 cps under accelerated storage condition.

Example 12: Suspoemulsion Composition of 35% Elemental Sulphur and 10% Fluensulfone 3.5 parts of alcohol ethoxylate followed by 2 parts of Powerblox SN, 2 parts of Stepac TSPK, 0.1 part of Benzisothiazolinone and 5 parts of propylene glycol were added to a sufficient quantity of water in a beaker. To this mixture 35 parts of elemental sulphur followed by mixture of 10 parts of fluensulfone and 5 parts of Garasol 110 and 1 part of diocotyl sulfosuccinate sodium was added. The slurry obtained was blended using a lab homogenizer for 30 minutes and milled using a bead mill to get the desired particle size. 0.1 parts of Xanthan gum was added to the milled mixture to get the desired viscosity The composition has particle size of about 7 microns, suspensibility of about 85, viscosity of about 390 cps, and pourability of less than 1%, wet sieve retention of 0.01%. The composition has suspensibility of about 82%, and viscosity of about 410 cps under accelerated storage condition.

Example 13: Suspoemulsion Composition of 55% Elemental Sulphur and 0.1% Fluensulfone To a sufficient quantity of water in a beaker, 5 parts of monoethylene glycol, 4.5 parts of alcohol ethoxylate, 2 parts of Resicare MSW and 0.1 part of Benzisothiazolinone was added to obtain a mixture. 55 parts of sulphur was then added to the mixture and the suspension obtained was uniformly mixed using a homogenizer and then passed through a wet mill to get the desired particle size range. 0.1 parts of fluensulfone was then dissolved in 5 parts of C9 hydrocarbon solvent and 2 parts of Soprophor 3D33 was then added to the mixture. The Fluensulfone mixture was then added to the milled sulphur suspension. Further 0.08 parts of xanthan gum was added to get the desired viscosity.

The composition has particle size of about 23 microns, suspensibility of about 97%, viscosity of about 480 cps, and pourability of less than 2%, wet sieve retention of 0.02%. The composition has suspensibility of about 90%, and viscosity of about 450 cps under accelerated storage condition.

Example 14: ZC Composition of 30% Elemental Sulphur and 15% Fluensulfone

Firstly Sulphur slurry was prepared by taking sufficient quantity of water (quantity sufficient) in a beaker and adding the surfactants such as 5 parts of Tamol DN and 5 parts of monoethylene glycol. 30 parts of Sulphur was then added and milled to get the desired particle size. To obtain the fluensulfone capsulated suspension 15 parts of Fluensulfone and 10 parts of Solvesso 200ND was mixed. Further a solution of 2 parts of Gohsenol GH17R was prepared in water. 1.5 parts of toluene diisocyanate was added to the oil phase and add dropwise to the Gohsenol solution in water at 50 degrees C. Further 0.5 parts of Ethylenediamine was dissolved in water, followed by 0.2 parts of acetic acid. The pH was adjusted to 6.0-7.5 using 0.05 parts of sodium hydroxide solution. Thereafter, the milled suspension of Sulphur and Fluensulfone CS in 1:1 w/w ratio was mixed. 0.1 parts of xanthan gum and 0.1 part of Benzisothiazolinone were then added under stirring. The resulting ZC composition had a Sulphur content of 30% and Fluensulfone content of 15%. The composition has particles with size of about 13 microns with suspensibility of 96%, dispersibility of 85%. The composition has suspensibility of about 90%, under accelerated storage condition.

Example 15: ZC Composition of 20% Elemental Sulphur and 10% Fluensulfone

Firstly Sulphur slurry was prepared by taking sufficient quantity of water (quantity sufficient) in a beaker and adding the surfactants such as 5 parts of Soprophor 3D33 parts of monoethylene glycol and 2 parts of Resicare MSW. 20 parts of Sulphur was then added and milled to get the desired particle size. To obtain the fluensulfone capsulated suspension 10 parts of Fluensulfone and 5 parts of Solvesso 200ND was mixed. Further a solution of 1.5 parts of Kuraray Poval 3-98 was prepared in water. 1.5 parts of Polymethylene diisocyanate was added to the oil phase and added dropwise to the Kuraray Poval 3-98 solution in water at 50 degrees C. Further 1.25 parts of Trimethylol propane was dissolved in water and added to the dispersion. Thereafter, the milled suspension of Sulphur and Fluensulfone CS in 1:1 w/w ratio was mixed. 0.12 parts of xanthan gum and 0.1 part of Benzisothiazolinone were then added under stirring. The resulting ZC composition had a Sulphur content of 21% and Fluensulfone content of 10%.

The composition has particles with size of about 18 microns with suspensibility of 89%, The composition has suspensibility of about 78%, under accelerated storage condition.

Example 16: ZC Composition of 25% Elemental Sulphur and 1% Fluensulfone

Firstly, Sulphur slurry was prepared by taking sufficient quantity of water (quantity sufficient) in a beaker and adding the surfactants such as 3 parts of Polycarboxylate sodium, 5 parts of propylene glycol and 2 parts of Morwet D425. 25 parts of Sulphur was then added and milled to get the desired particle size. To obtain the fluensulfone capsulated suspension, 1 part of Fluensulfone and 5 parts of Garosol 110 was mixed. Further a solution of 1.5 parts of Kuraray Poval 3-98 was prepared in water. 1.5 parts of Polymethylene diisocyanate was added to the oil phase and add dropwise to the Kuraray Poval 3-98 in water at 50 degrees C. Further 0.5 parts of ethylene diamine was dissolved in water, followed by 0.2 parts of citric acid. The pH was adjusted to 6.0-7.5 using 0.05 parts of potassium hydroxide solution. Thereafter, the milled suspension of Sulphur and Fluensulfone CS in 1:1 w/w ratio was mixed. 0.11 parts of xanthan gum and 0.1 part of Benzisothiazolinone were added under stirring. The resulting ZC composition had a Sulphur content of 25% and Fluensulfone content of 5%.

The composition has particles with size of about 15 microns with suspensibility of 87%. The composition has suspensibility of about 81% under accelerated storage condition.

Example 17: Water Dispersible Granules of Capsulated Suspension of 60% Elemental Sulphur and 20% Fluensulfone Firstly, a slurry of 60 parts of sulphur with 5 parts of Tamol DN and 5 parts of Lignin sulphonate sodium was prepared in water and milled using a suitable mill to get a desired particle size. Further to prepare the capsulated suspension composition, 20 parts of Fluensulfone were mixed with 5 parts of Solvesso 200ND. A solution of 2 parts of Gohsenol GH17R in water was then prepared. 1.5 parts of Toluene diisocyanate was added to the oil phase and which was added dropwise to the Gohsenol solution in water at 50 degrees C. Further 0.75 parts of Soprophor TSPK, 0.5 parts ethylenediamine was dissolved in water, followed by 0.2 parts of Acetic acid. The pH was then Adjusted to 6.0-7.5 using 0.05 parts Sodium hydroxide solution. Further the milled slurry of Sulphur and the CS of Fluensulfone was mixed and the resulting dispersion was spray dried to obtain water dispersible granules of capsulated suspension.

The composition has a particle size of 10 microns, suspensibility of 91%, dispersibility of 86%, and wettability of 30 seconds. The composition has suspensibility of about 87%, dispersibility of 80% under accelerated storage condition.

Example 18: Water Dispersible Granules of Capsulated Suspension of 20% Elemental Sulphur and 30% Fluensulfone Firstly, a slurry of 20 parts of sulphur with 3 parts of polycarboxylate sodium and 10 parts of Lignin sulphonate sodium was prepared in water and milled using a suitable mill to get a desired particle size. Further to prepare the capsulated suspension composition, 30 parts of Fluensulfone were mixed with 7 parts of acetophenone. A solution of 2 parts of Kuraray 3-98 in water was then prepared. 1.5 parts of Polymethylene diisocyanate was added to the oil phase and which was added dropwise to the Kuraray 3-98 solution in water at 50 degrees C. 0.5 parts ethylenediamine was dissolved in water, followed by 0.2 parts of citric acid were added. The pH was then Adjusted to 6.0-7.5 using 0.05 parts Sodium hydroxide solution. Further 0.75 parts of Naphthalene sulphonate sodium, 25 parts of sodium sulphate were added. Further the milled slurry of Sulphur and the CS of Fluensulfone was mixed and the resulting dispersion was spray dried to get a suitable dry capsulated formulation in the form of water dispersible granules. The composition has particle size of 12 microns, suspensibility of 80%, dispersibility of 65%, and wettability of 80 seconds. The composition has suspensibility of about 75%, dispersibility of 61% under accelerated storage condition and wettability of 88 seconds after ATS.

Example 19: Water Dispersible Granules of Capsulated Suspension of 40% Elemental Sulphur and 0.10% Fluensulfone Firstly, a slurry of 40 parts of sulphur with 3 parts of polycarboxylate sodium and 3 parts of Morwet D425 was prepared in water and milled using a suitable mill to get a desired particle size. Further to prepare the capsulated suspension composition, 0.1 parts of Fluensulfone were mixed with 5 parts of Solvesso 100. A solution of 2 parts of Kuraray 3-98 in water was then prepared. 1.5 parts of hexamethylene diisocyanate was added to the oil phase and which was added dropwise to the Kuraray 3-98 solution in water at 50 degrees C. To this dispersion 0.5 parts ethylenediamine dissolved in water, followed by 0.2 parts of citric acid was added. The pH was then Adjusted to 6.0-7.5 using 0.05 parts Sodium hydroxide solution. Further 1.75 parts of Morwet EFW, 9 parts of ammonium sulphate, 10 parts of Borresperse NA and 23.9 parts of China clay were added. Further the milled slurry of Sulphur and the CS of Fluensulfone was mixed and the resulting dispersion was spray dried to get a suitable dry capsulated formulation in the form of water dispersible granules. The composition has particle size of 8.8 microns, suspensibility of 84%, dispersibility of 68%, and wettability of 48 seconds. The composition has suspensibility of about 82%, dispersibility of 60% under accelerated storage condition, wettability after ATS 54

A. Field Study:

Field Trial 1: To Study Effect of Elemental Sulphur and Fluensulfone for Controlling Nematode Pest in Cowpea.

The field trials were carried out to study the effect of the composition of elemental sulphur and fluensulfone on controlling nematode pests in cowpea. The trial was laid out during Rabi season i.e. January to April in Randomized Block Design (RBD) with ten treatments including untreated control, replicated four times. The test product sample, sulphur and fluensulfone, alone and in combination in prescribed dosages were applied as soil application after planting of cow pea seeds in the trial plot. The cow pea crop in trial field was raised following good agricultural practice.

Details of Experiment a) Trial Location: Idar, Gujarat b) Crop: Cow Pea (var. Keshvin seeds)

c) Experiment season: Rabi d) Trial Design: RBD e) Replications: Four f) Treatments: Ten g) Plot size: 5×6=30 sqm h) Date of sowing: 08.01.2022 i) Date of Application: 08.01.2022 j) Method of application: Soil application k) Date of Harvesting: 8.04.2022

The observation on crop damage caused by *Meloidogyne incognita* were recorded at 90 days after planting of the cow pea plant from each plot and the percentage control was calculated using following formula:

$$\text{Control (\%)} = \frac{[\text{Damage in control plot} - \text{Damage in treated plot}]}{\text{Damage in control plot}} \times 100$$

The mean data on control against the nematode pests along with the grain yield was recorded at harvest and is presented in the Tables 1 and 2:

TABLE 1

| Treatment No. | Composition | Active ingredient (grams/ha) | | *No of nodules/ plant (Mean of 10 plants) at 90 DAS | % Reduction of nematode infection over control (90 DAS) | Yield Kg/ HA | % in yield increase |
|---|---|---|---|---|---|---|---|
| | | Sulphur | Fluensulfone | | | | |
| T1 | Sulphur 90% + Fluensulfone 0.2% WP @ 10000 g/ha according to an embodiment of the present invention. | 9000 | 20 | 9.2 | 85.23 *(75.79) | 1530 | 56.12 |
| T2 | Sulphur 45% + Fluensulfone 0.1% WP @ 20000 g/ha according to an embodiment of the present invention. | 9000 | 20 | 9.4 | 84.91 *(75.79) | 1510 | 54.08 |
| T3 | Fluensulfone 2% Gr@ 1000 g/ha | | 20 | 33.2 | 46.70 *(75.79) | 1010 | 3.06 |
| T4 | Sulphur 80% WG @ 11250 g/ha | 9000 | — | 28.3 | 54.57 *(75.79) | 1400 | 42.85 |
| T5 | Untreated Control | | — | 62.3 | — | 980 | — |

WP: Wettable powder compositions

DAS: Days after spray

*Synergy calculation

*Higher the number of nodules observed, greater is the nematode infestation.

It can be seen from table 1 that the application of Treatment 1 with Sulphur 9000+Fluensulfone 0.2% wettable powder @ 10000 g/ha and Treatment 2 with Sulphur 45%+ Fluensulfone 0.1% wettable powder @ 20000 g/ha, as per the embodiment of present invention was highly effective in controlling the nematode pests in cow pea at 90 days after application as compared to the Treatments 3 and 4 where sulphur and fluensulfone are applied individually. It can be seen that Treatments 1 and 2 showed a 85.23% and 84.91% reduction in nematode control over the untreated control as compared to treatments 3 and 4 with individual actives which only showed a 46.70% and 54.57% reduction in nematode control over the untreated, respectively. The results are all the more surprising as the dosages of sulphur and fluensulfone applied in individual treatments and in combination are the same. The surprising synergistic results of treatment 1 and 2, are attributed to the composition of sulphur and fluensulfone, as per the embodiments of the invention, where both the actives are present in a single composition in specific concentration. The enhanced efficacy is further attributed to the form of the composition, i.e. wettable powder as shown in the present study, which includes particles in the size range of 0.1 micron to 60 microns.

Further, the composition as per the embodiment of the present invention, on account of significant control of the nematode population and due to the presence of sulphur in the composition, not only assists in controlling the pests, but also additionally provides nutrition to the plant, thus showing a significant enhancement in the yield as well as other crop characteristics such as plant height, root length and improved foliage, as compared to the yield observed with individual applications of sulphur and fluensulfone.

TABLE 2

| Treat-ment No. | Composition | Active ingredient (grams/ha) | | *No of nod-ules/ plant (Mean of 10 plants) at 90 DAS | % Re-duction of nema-tode infection over control (90 DAS) | Yield in Kg/ HA | % yield in-crease |
|---|---|---|---|---|---|---|---|
| | | Sul-phur | Fluen-sulfone | | | | |
| T1 | Sulphur 40% + Fluensulfone 30% WP @ 1800 g/ha according to an embodiment of the present invention. | 720 | 540 | 2.3 | 96.58 *(85.24) | 1370 | 35.64 |
| T2 | Sulphur 20% + Fluensulfone 15% WP @ 3600 g/ha according to an embodiment of the present invention. | 720 | 540 | 2.7 | 95.99 *(85.24) | 1390 | 37.62 |
| T3 | Fluensulfone 2% Gr@, 27000 g/ha | — | 540 | 11.3 | 83.23 *(85.24) | 1140 | 12.87 |
| T4 | Sulphur 80% WG @ 900 g/ha | 720 | — | 59.3 | 12.01 *(85.24) | 1190 | 17.82 |
| T5 | Untreated Control | — | — | 67.4 | | 1010 | |

WP: Wettable powder compositions
DAS: Days after spray
*Synergy calculation
*Higher the number of nodules observed per plant, greater is the nematode infestation It can be seen from table 2 that the application of Treatment 1 with Sulphur 40%+Fluensulfone 30% wettable powder composition it 1800 g/ha and Treatment 2 with Sulphur 20%+Fluensulfone 15% wettable powder composition@ 3600 g/ha, as per the embodiments of present invention, was highly effective in controlling the nematode pests in cow pea at 90 Days after application as compared to the Treatments 3 and 4 where sulphur and fluensulfone are applied individually. It can be seen that Treatments 1 and 2 showed a 96.58 and 95.99% reduction in nematode control over the untreated control as compared to treatments 3 and 4 with individual actives which showed a poor control over the untreated. The results are all the more surprising as the dosages of sulphur and fluensulfone applied in individual treatments and in combination are the same. The surprising synergistic results of treatment 1 and 2, are attributed to the composition of sulphur and fluensulfone, as per the embodiments of the invention, where both the actives are present in a single composition in specific concentration. The enhanced efficacy is further attributed to the form of the composition, i.e. wettable powder as shown in the present study, which includes particles in the size range of 0.1 micron to 60 microns.

Further, the composition as per the embodiment of the present invention, on account of significant control of the nematode population and due to the presence of sulphur in the composition not only assists in controlling the pests, but also additionally provides nutrition to the plant, thus showing a significant enhancement in the yield as well as other crop characteristics such as plant height, root length and improved foliage, as compared to the yield observed with individual applications of sulphur and fluensulfone.

Field Trial 2: To Study Effect of Elemental Sulphur and Fluensulfone for Controlling Nematode Pest in Cowpea.

The field trials were carried out to study the effect of the composition of elemental sulphur and fluensulfone on controlling nematode pests in cowpea. The trial was laid out during Rabi season i.e. January to April in Randomized Block Design (RBD) with ten treatments including untreated control, replicated four times. The test product sample, sulphur and fluensulfone, alone and in combination with prescribed dose were applied as soil application after planting of cow pea seeds in the trial plot. The cow pea crop in trial field was raised following good agricultural practice.

Details of Experiment a) Trial Location: Prantij, Gujarat
b) Crop: Cow Pea (var. Keshvin seeds)
c) Experiment season: Rabi
d) Trial Design: RBD
e) Replications: Four
f) Treatments: Ten
g) Plot size: 5×6=30 sqm
h) Date of sowing: 10.01.2022
i) Date of Application: 10.01.2022
j) Method of application: Soil application
k) Date of Harvesting: 10.04.2022

The observation on crop damage caused by *Meloidogyne incognita* were recorded at 90 days after planting of the cow pea plant from each plot and the percentage control was calculated using following formula:

$$\text{Control (\%)} = [\text{Damage in control plot} - \text{Damage in treated plot}] / $$
$$\text{Damage in control plot}] \times 100$$

The mean data on control against the nematode pests along with the grain yield was recorded at harvest and is presented in the Tables 3 and 4:

TABLE 3

| Treat-ment No. | Composition | Active ingredient (grams/ha) | | *No of nod-ules/ plant (Mean of 10 plants) at 90 DAS | % Re-duction of nema-tode infection over control (90 DAS) | Yield in kg/ ha | % yield in-crease un-treated control |
|---|---|---|---|---|---|---|---|
| | | Sul-phur | fluen-sulfone | | | | |
| T1 | Sulphur 88% + Fluensulfone 1% WG @ 4000 g/ha according to an embodiment of the present invention. | 3520 | 40 | 7.7 | 85.58 *(55.97) | 1430 | 40.19 |

TABLE 3-continued

| Treat-ment No. | Composition | Active ingredient (grams/ha) | | *No of nod-ules/ plant (Mean of 10 plants) at 90 DAS | % Re-duction of nema-tode infection over control (90 DAS) | Yield in kg/ ha | % yield in-crease over un-treated control |
|---|---|---|---|---|---|---|---|
| | | Sul-phur | fluen-sulfone | | | | |
| T2 | Sulphur 44% + Fluensulfone 0.5% WG @ 8000 g/ha according to an embodiment of the present invention. | 3520 | 40 | 7.4 | 86.14 *(55.97) | 1410 | 38.23 |
| T3 | Fluensulfone 2% Gr@ 2000 g/ha | — | 40 | 28.4 | 46.81 *(55.97) | 1070 | 4.90 |
| T4 | Sulphur 80% WG @ 4400 g/ha | 3520 | — | 44.2 | 17.22 *(55.97) | 1240 | 21.56 |
| T5 | Untreated Control | — | — | 53.4 | | 1020 | |

WG: Water dispersible granular composition
DAS: Days after spray
*Synergy calculation
*Higher the number of nodules observed per plant, greater is the nematode infestation It can be seen from table 3 that the application of Treatment 1 with Sulphur 88%+Fluensulfone T1% water dispersible granules it 4000 g/ha and Treatment 2 with Sulphur 44%+Fluensulfone 0.50% water dispersible granules it 8000 g/ha, as per the embodiment of present invention, showed a 85.58% and 86.14% reduction in nematode control over the untreated control, as compared to treatments 3 and 4 with individual actives which only showed a 46.81% and 17.22% reduction in nematode control over the untreated, respectively. Treatments with compositions as per the embodiments of the present invention were highly effective in controlling the nematode pests in cow pea at 90 days after application as compared to the Treatments 3 and 4 where sulphur and fluensulfone are applied individually. The surprising enhancement in efficacy is observed with compositions as per the embodiment of the present invention, even though the dosages of sulphur and fluensulfone applied in individual treatments and in compositions as per the present invention are the same. The surprising synergistic results of treatment 1 and 2, are attributed to the composition of sulphur and fluensulfone, as per the embodiments of the invention, where both the actives are present in a single composition in specific concentration. The enhanced efficacy is further attributed to the form of the composition, i.e. water dispersible granules as shown in the present study, which includes particles in the size range of 0.1 micron to 30 microns.

Further, the composition as per the embodiment of the present invention, on account of significant control of the nematode population and due to the presence of sulphur in the composition not only assists in controlling the pests, but also additionally provides nutrition to the plant, thus showing a significant enhancement in the yield as well as other crop characteristics such as plant height, root length and improved foliage, as compared to the yield observed with individual applications of sulphur and fluensulfone.

TABLE 4

| Treat-ment No. | Composition | Active ingredient (grams/ha) | | *No of nod-ules/ plant (Mean of 10 plants) at 90 DAS | % Re-duction of nema-tode infection over control (90 DAS) | Yield in kg/ ha | % yield in-crease over un-treated control |
|---|---|---|---|---|---|---|---|
| | | Sul-phur | fluen-sulfone | | | | |
| T1 | Sulphur 40% + Fluensulfone 10% WG @ 2500 g/ha according to an embodiment of the present invention. | 1000 | 250 | 6.5 | 89.63 *(80.51) | 1390 | 41.83 |
| T2 | Sulphur 20% + Fluensulfone 5% WG @ 5000 g/ha according to an embodiment of the present invention. | 1000 | 250 | 6.3 | 89.95 *(80.51) | 1380 | 40.81 |
| T3 | Fluensulfone 2% Gr@ 12500 g/ha | — | 250 | 14.4 | 77.03 *(80.51) | 1230 | 20.32 |
| T4 | Sulphur 80% WG @ 1250 g/ha | 1000 | — | 53.2 | 15.15 *(80.51) | 1140 | 16.32 |
| T5 | Untreated Control | — | — | 62.7 | | 980 | |

WG: Water dispersible granular composition
DAS: Days after spray
*Synergy calculation
*Higher the number of nodules observed per plant, greater is the nematode infestation It can be seen from table 4 that the application of Treatment 1 with Sulphur 40%+Fluensulfone 1% water dispersible granules @ 2500 g/ha and Treatment 2 with Sulphur 22%+Fluensulfone 50% water dispersible granules @ 5000 g/ha, as per the embodiment of present invention, showed a 89.63% and 89.95% reduction in nematode control over the untreated control as compared to treatments 3 and 4 with individual actives which only showed a 77.03% and 15.15% reduction in nematode control over the untreated, respectively. Treatments with compositions as per the embodiments of the present invention were highly effective in controlling the nematode pests in cow pea at 90 days after application as compared to the Treatments 3 and 4 where sulphur and fluensulfone are applied individually. The surprising enhancement in efficacy is observed with compositions of the present invention even though the dosages of sulphur and fluensulfone applied in individual treatments and in compositions as per the present invention are the same. The surprising synergistic results of treatment 1 and 2, are attributed to the composition of sulphur and fluensulfone, as per the embodiments of the invention, where both the actives are present in a single composition in specific concentration. The enhanced efficacy is further attributed to the form of the composition, i.e. i.e. water dispersible granules as shown in the present study, which includes particles in the size range of 0.1 micron to 30 microns.

Further, the composition as per the embodiment of the present invention, on account of significant control of the nematode population and due to the presence of sulphur in the composition not only assists in controlling the pests, but also additionally provides nutrition to the plant, thus showing a significant enhancement in the yield as well as other crop characteristics such as plant height, root length and improved foliage, as compared to the yield observed with individual applications of sulphur and fluensulfone.

Field Trial 3: To Study Effect of Elemental Sulphur and Fluensulfone for Controlling Nematode Pest in Cowpea.

The field trials were carried out to study the effect of the composition of elemental sulphur and fluensulfone on controlling nematode pests in cowpea. The trial was laid out during Rabi season i.e. January to April in Randomized Block Design (RBD) with ten treatments including untreated control, replicated six times. The test product sample, sulphur and fluensulfone, alone and in combination with prescribed dose were applied as soil application after planting of cow pea seeds in the trial plot. The cow pea crop in trial field was raised following good agricultural practice.

Details of Experiment a) Trial Location: Gandhinagar, Gujarat b) Crop: Cow Pea (var. Keshvin seeds)

c) Experiment season: Rabi d) Trial Design: RBD e) Replications: four f) Treatments: Ten g) Plot size: 5×6=30 sqm h) Date of sowing: 15.01.2022 i) Date of Application: 15.01.2022 j) Method of application: Soil application k) Date of Harvesting: 15.04.2022

The observation on crop damage caused by *Meloidogyne incognita* were recorded at 90 days after planting of the cow pea plant from each plot and the percentage control was calculated using following formula:

Control (%) = [Damage in control plot − Damage in treated plot]/

Damage in control plot] × 100

The mean data on control against the nematode pests along with the grain yield was recorded at harvest and is presented in the Tables 5 and 6:

42

TABLE 5

| Treat-ment No. | Composition | Active ingredient (grams/ha) | | *No of nod-ules/ plant (Mean of 10 plants) at 90 DAS | % Re-duction of nema-tode infection over control (90 DAS) | Yield in kg/ha | % yield in-crease |
|---|---|---|---|---|---|---|---|
| | | Sul-phur | Fluen-sulfone | | | | |
| T1 | Sulphur 60% + Fluensulfone 20% water dispersible granules of capsulated suspension @ 1200 g/ha according to an embodiment of the present invention. | 720 | 240 | 6.1 | 90.28 *(76.22) | 1390 | 29.90 |
| T2 | Sulphur 30% + Fluensulfone 10% water dispersible granules of capsulated suspension @ 2400 g/ha according to an embodiment of the present invention. | 720 | 240 | 6.2 | 90.12 *(76.22) | 1410 | 31.77 |
| T3 | Fluensulfone 2% Gr@ 12000 g/ha | — | 240 | 17.3 | 72.45 *(76.22) | 1190 | 11.21 |
| T4 | Sulphur 80% WG @ 900 g/ha | 720 | — | 54.2 | 13.69 *(76.22) | 1230 | 14.95 |
| T5 | Untreated Control | — | — | 62.8 | | 1070 | |

DAS: Days after spray
*Synergy calculation
*Higher the number of nodules observed per plant, greater is the nematode infestation It can be seen from table 5 that the application of Treatment 1 with Sulphur 60%+Fluensulfone 20% water dispersible granules of capsulated suspension @ 1200 g/ha and Treatment 2 with Sulphur 30%+Fluensulfone 10% water dispersible granules of capsulated suspension A 2400 g/ha, as per the embodiment of present invention, showed a 90.28% and 90.12% reduction in nematode over the untreated control as compared to treatments 3 and 4 with individual actives which only showed a 72.45% and 13.69% reduction in nematode control over the untreated, respectively. Treatments with compositions as per the embodiments of the present invention were highly effective in controlling the nematode pests in cow pea at 90 days after application as compared to the Treatments 3 and 4 where sulphur and fluensulfone are applied individually. The surprising enhancement in efficacy is observed with compositions of the present invention even though the dosages of sulphur and fluensulfone applied in individual treatments and in compositions as per the present invention are the same. The surprising synergistic results of treatment 1 and 2, are attributed to the composition of sulphur and fluensulfone, as per the embodiments of the invention, where both the actives are present in a single composition in specific concentration. The enhanced efficacy is further attributed to the form of the composition, i.e. water dispersible granules of capsulated suspension as shown in the present study, which includes particles in the size range of 0.1 micron to 30 microns.

Further, the composition as per the embodiment of the present invention, on account of significant control of the nematode population and due to the presence of sulphur in the composition not only assists in controlling the pests, but also additionally provides nutrition to the plant, thus showing a significant enhancement in the yield as well as other crop characteristics such as plant height, root length and improved foliage, as compared to the yield observed with individual applications of sulphur and fluensulfone.

TABLE 6

| Treat-ment No. | Composition | Active ingredient (grams/ha) Sul-phur | Fluen-sulfone | *No of nod-ules/ plant (Mean of 10 plants) at 90 DAS 90 DAS | % Re-duction of nema-tode infection over control (90 DAS) | Yield in kg/ ha | % yield in-crease |
|---|---|---|---|---|---|---|---|
| T1 | Sulphur 40% + Fluensulfone 0.20% water dispersible granules of capsulated suspension @ 10000 g/ha according to an embodiment of the present invention. | 4000 | 20 | 9.2 | 85.23 *(75.79) | 1240 | 26.53 |
| T2 | Sulphur 20% + Fluensulfone 0.10% water dispersible granules of capsulated suspension @ 20000 g/ha according to an embodiment of the present invention. | 4000 | 20 | 9.4 | 84.91 *(75.79) | 1270 | 29.59 |
| T3 | Fluensulfone 2% Gr@ 1000 g/ha | — | 20 | 33.2 | 46.70 *(75.79) | 1010 | 3.06 |
| T4 | Sulphur 80% WG @ 5000 g/ha | 4000 | — | 28.3 | 54.57 *(75.79) | 1130 | 15.30 |
| T5 | Untreated Control | — | — | 62.3 | | 980 | |

DAS: Days after spray
*Synergy calculation
*Higher the number of nodules observed per plant, greater is the nematode infestation It can be seen from table 6 that the application of Treatment 1 with Sulphur 40%+Fluensulfone 0.20% water dispersible granules of capsulated suspension @ 10000 g/ha and Treatment 2 with Sulphur 20%+Fluensulfone 0.10% water dispersible granules of capsulated suspension @ 20000 g/ha, as per the embodiment of present invention, showed a 85.23% and 84.91% reduction in nematode over the untreated control as compared to treatments 3 and 4 with individual actives which only showed a 46.70% and 54.57% reduction in nematode control over the untreated, respectively. Treatments with compositions as per the embodiments of the present invention were highly effective in controlling the nematode pests in cow pea at 60 days after application as compared to the Treatments 3 and 4 where sulphur and fluensulfone are applied individually. The surprising enhancement in efficacy is observed with compositions of the present invention even though the dosages of sulphur and fluensulfone applied in individual treatments and in compositions as per the present invention are the same. The surprising synergistic results of treatment 1 and 2, are attributed to the composition of sulphur and fluensulfone, as per the embodiments of the invention, where both the actives are present in a single composition in specific concentration. The enhanced efficacy is further attributed to the form of the composition, i.e. water dispersible granules of capsulated suspension as shown in the present study, which includes particles in the size range of 0.1 micron to 30 microns.

Further, the composition as per the embodiment of the present invention, on account of significant control of the nematode population and due to the presence of sulphur in the composition not only assists in controlling the pests, but also additionally provides nutrition to the plant, thus showing a significant enhancement in the yield as well as other crop characteristics such as plant height, root length and improved foliage, as compared to the yield observed with individual applications of sulphur and fluensulfone.

Field Trial 4: To Study Effect of Elemental Sulphur and Fluensulfone for Controlling Nematode Pest in Tomato.

The field trials were carried out to study the effect of the composition of elemental sulphur and fluensulfone on controlling nematode pests in tomato. The trial was laid out during Rabi season i.e. January to April in Randomized Block Design (RBD) with ten treatments including untreated control, replicated five times. The test product sample, sulphur and fluensulfone, alone and in combination with prescribed dose were applied as soil application after planting of tomato seedlings in the trial plot. The tomato crop in the trial field was raised following good agricultural practices.

Details of Experiment a) Trial Location: Indore, Madhya Pradesh b) Crop: Tomato c) Experiment season: Rabi d) Trial Design: RBD e) Replications: Five f) Treatments: Ten g) Plot size: 5×6=30 sqm h) Date of sowing: 10.01.2022 i) Date of Application: 10.01.2022 j) Method of application: Soil application k) Crop Variety: Abhilash k) Date of Harvesting: 18.04.2022

The observation on crop damage caused by *Meloidogyne incognita* were recorded at 70 days after planting of the tomato plant from each plot and the percentage control was calculated using following formula:

$$\text{Control (\%)} = [\text{Damage in control plot} - \text{Damage in treated plot}]/$$
$$\text{Damage in control plot}] \times 100$$

The mean data on control against the nematode pests along with the crop yield was recorded at harvest and is presented in the Tables 7 and 8:

TABLE 7

| Treat-ment No. | Composition | Active ingredient (grams/ha) Sul-phur | Active ingredient (grams/ha) Fluen-sulfone | *No of nod-ules/ plant (Mean of 10 plants) at 70 DAS | % Re-duction of nema-tode infection over control (70 DAS) | yield in kg/ ha | % yield in-crease |
|---|---|---|---|---|---|---|---|
| T1 | Sulphur 60% + Fluensulfone 0.2%) SC @ 14000 g/ha according to an embodiment of the present invention. | 8400 | 28 | 8.2 | 87.12 *(73.90) | 39500 | 28.24 |
| T2 | Sulphur 30% + Fluensulfone 0.1%) SC @ 28000 g/ha according to an embodiment of the present invention. | 8400 | 28 | 8.1 | 87.28 *(73.90) | 39700 | 28.89 |
| T3 | Fluensulfone 2% Gr@ 1400 g/ha | — | 28 | 31.7 | 50.23 *(73.90) | 31200 | 1.29 |
| T4 | Sulphur 80% WG@ 10500 g/ha | 8400 | — | 33.4 | 47.56 *(73.90) | 37400 | 21.42 |
| T5 | Untreated Control | — | — | 63.7 | | 30800 | |

SC: Suspension concentrate or liquid suspension composition
DAS: Days after spray
*Synergy calculation It can be seen from table 7 that the application of Treatment 1 with Sulphur 60%+Fluensulfone 0.2% SC@14000 g/ha and Treatment 2 with Sulphur 30%+Fluensulfone 0.1% SC @ 28000 g/ha, as per the embodiment of present invention, showed a 87.12% and 87.28% reduction in nematode control over the untreated control as compared to treatments 3 and 4 with individual actives which only showed a 50.23% and 47.56% reduction in nematode control over the untreated, respectively. Treatments with composi-tions as per the embodiments of the present invention were highly effective in controlling the nematode pests in tomato at 70 days after application as compared to the Treatments 3 and 4 where sulphur and fluensulfone are applied individually. The enhancement in efficacy with the composition as per the present invention is surprising as the dosages of sulphur and fluensulfone applied in individual treatments and in compositions as per the present invention are the same. The surprising synergistic results of treatment 1 and 2, are attributed to the composition of sulphur and fluen-sulfone, as per the embodiments of the invention, where both the actives are present in a single composition in specific concentration. The enhanced efficacy is further attributed to the form of the composition, i.e. suspension concentrate as shown in the present study, which includes particles in the size range of 0.1 micron to 30 microns.

Further, the composition as per the embodiment of the present invention, on account of significant control of the nematode population and due to the presence of sulphur in the composition not only assists in controlling the pests, but also additionally provides nutrition to the plant, thus show-ing a significant enhancement in the yield as well as other crop characteristics such as plant height, root length, fruit size and improved foliage, as compared to the yield observed with individual applications of sulphur and fluen-sulfone.

TABLE 8

| Treat-ment No. | Composition | Active ingredient (grams/ha) Sul-phur | Active ingredient (grams/ha) fluen-sulfone | *No of nod-ules/ plant (Mean of 10 plants) at 70 DAS | % Re-duction of nema-tode infection over control (70 DAS) | yield in kg/ ha | % yield in-crease |
|---|---|---|---|---|---|---|---|
| T1 | Sulphur 40% + Fluensulfone 5%) SC @4000 g/ha according to an embodiment of the present invention. | 1600 | 200 | 7.8 | 87.96 *(79.34) | 31800 | 25.19 |
| T2 | Sulphur 20% + Fluensulfone 2.5%) SC @8000 g/ha according to an embodiment of the present invention. | 1600 | 200 | 7.3 | 88.73 *(79.34) | 31700 | 24.80 |
| T3 | Fluensulfone 2% Gr@ 10000 g/ha | — | 200 | 18.3 | 71.75 *(79.34) | 26300 | 3.54 |
| T4 | Sulphur 80% WG@ 2000 g/ha | 1600 | — | 47.4 | 26.85 *(79.34) | 28800 | 13.38 |
| T5 | Untreated Control | — | — | 64.8 | | 25400 | |

SC: Suspension concentrate or liquid suspension composition
DAS: Days after spray
*Synergy calculation It can be seen from table 8 that the application of Treatment 1 with Sulphur 40%+Fluensulfone 5% SC @4000 g/ha and Treatment 2 with Sulphur 20%+Fluensulfone 2.5% SC @8000 g/ha, as per the embodiment of present invention, showed a 87.96% and 88.73% reduction in nematode control over the untreated control as compared to treatments 3 and 4 with individual actives which only showed a 71.75% and 26.85% reduction in nematode control over the untreated, respectively. Treatments with compositions as per the embodiments of the present invention were highly effective in controlling the nematode pests in tomato at 70 days after application as compared to the Treatments 3 and 4 where sulphur and fluensulfone are applied individually. The enhancement in efficacy with the composition as per the present invention is surprising as the dosages of sulphur and fluensulfone applied in individual treatments and in compositions as per the present invention are the same. The surprising synergistic results of treatment 1 and 2, are attributed to the composition of sulphur and fluensulfone, as per the embodiments of the invention, where both the actives are present in a single composition in specific concentration. The enhanced efficacy is further attributed to the form of the composition, i.e. suspension concentrate as shown in the present study, which includes particles in the size range of 0.1 micron to 30 microns.

Further, the composition as per the embodiment of the present invention, on account of significant control of the nematode population and due to the presence of sulphur in the composition not only assists in controlling the nematodes, but also additionally provides nutrition to the plant, thus showing a significant enhancement in the yield as well as other crop characteristics such as plant height, root length, fruit size and improved foliage, as compared to the yield observed with individual applications of sulphur and fluensulfone.

Field Trial 5: To Study Effect of Elemental Sulphur and Fluensulfone for Controlling Nematode Pest in Tomato.

The field trials were carried out to study the effect of the composition of elemental sulphur and fluensulfone on controlling nematode pests in tomato. The trial was laid out during Rabi season i.e. January to April in Randomized Block Design (RBD) with ten treatments including untreated control, replicated five times. The test product sample, sulphur and fluensulfone, alone and in combination with prescribed dose were applied as soil application after planting of tomato seedlings in the trial plot. The tomato crop in the trial field was raised following good agricultural practices.

Details of Experiment a) Trial Location: Bhopal, Madhya Pradesh
b) Crop: Tomato
c) Experiment season: Rabi
d) Trial Design: RBD
e) Replications: Five
f) Treatments: Ten
g) Plot size: 5×6=30 sqm
h) Date of sowing: 14.01.2022
i) Date of Application: 14.01.2022
j) Method of application: Soil application
k) Date of Harvesting: 22.04.2022

The observation on crop damage caused by *Meloidogyne incognita* were recorded at 70 days after planting of the tomato plant from each plot and the percentage control was calculated using following formula:

$$\text{Control (\%)} = [\text{Damage in control plot} - \text{Damage in treated plot}] / [\text{Damage in control plot}] \times 100$$

The mean data on control against the nematode pests along with the crop yield was recorded at harvest and is presented in the Tables 9 and 10:

TABLE 9

| Treatment No. | Composition | Active ingredient (grams/ha) | | *No of nodules/ plant (Mean of 10 plants) at 70 DAS | % Reduction of nematode infection over control (70 DAS) | yield in kg/ha | % yield increase |
|---|---|---|---|---|---|---|---|
| | | Sulphur | fluensulfone | | | | |
| T1 | Sulphur 55% + Fluensulfone 1%) SE @ 10000 g/ha according to an embodiment of the present invention. | 5500 | 100 | 6.8 | 89.89 *(82.84) | 35400 | 27.33 |
| T2 | Sulphur 27.5% + Fluensulfone 0.5%) SE @ 20000 g/ha according to an embodiment of the present invention. | 5500 | 100 | 6.4 | 90.49 *(82.84) | 35300 | 26.97 |
| T3 | Fluensulfone 2% Gr@ 5000 g/ha | — | 100 | 23.4 | 65.23 *(82.84) | 29320 | 5.46 |
| T4 | Sulphur 80% WG@ 6875 g/ha | 5500 | — | 33.2 | 50.66 *(82.84) | 32600 | 17.26 |
| T5 | Untreated Control | — | — | 67.3 | | 27800 | |

SE: Suspo-emulsion composition
DAS: Days after spray
*Synergy calculation
*Higher the number of nodules observed per plant, greater is the nematode infestation It can be seen from table 9 that the application of Treatment 1 with Sulphur 55%+Fluensulfone 1%) SE @ 10000 g/ha and Treatment 2 with Sulphur 27.5%+Fluensulfone 0.5%) SE @ 20000 g/ha, as per the embodiment of present invention, showed a 89.89% and 90.49% reduction in nematode control over the untreated control as compared to treatments 3 and 4 with individual actives which only showed a 65.23% and 50.66% reduction in nematode control over the untreated, respectively. Treatments with compositions as per the embodiments of the present invention were highly effective in controlling the nematode pests in tomato at 70 days after application as compared to the Treatments 3 and 4 where sulphur and fluensulfone are applied individually. The enhancement in efficacy with the composition as per the present invention is surprising as the dosages of sulphur and fluensulfone applied in individual treatments and in compositions as per the present invention are the same. The surprising synergistic results of treatment 1 and 2, are attributed to the composition of sulphur and fluensulfone, as per the embodiments of the invention, where both the actives are present in a single composition in specific concentration. The enhanced efficacy is further attributed to the form of the composition, i.e. suspoemulsion as shown in the present study, which includes particles in the size range of 0.1 micron to 30 microns.

Further, the composition as per the embodiment of the present invention, on account of significant control of the nematode population and due to the presence of sulphur in the composition not only assists in controlling the pests, but also additionally provides nutrition to the plant, thus showing a significant enhancement in the yield as well as other crop characteristics such as plant height, root length, fruit size and improved foliage, as compared to the yield observed with individual applications of sulphur and fluensulfone.

TABLE 10

| Treatment No. | Composition | Active ingredient (grams/ha) | | *No of nodules/ plant (Mean of 10 plants) at 70 DAS | % Reduction of nematode infection over control (70 DAS) | yield in kg/ha | % yield increase |
|---|---|---|---|---|---|---|---|
| | | Sulphur | fluensulfone | | | | |
| T1 | Sulphur 40% + Fluensulfone 15%) SE @3000 g/ha according to an embodiment of the present invention. | 1200 | 450 | 4.4 | 93.15 *(79.62) | 37300 | 25.71 |
| T2 | Sulphur 20% + Fluensulfone 7.5%) SE @ 6000 g/ha according to an embodiment of the present invention. | 1200 | 450 | 4.1 | 93.62 *(79.62) | 36800 | 24.03 |
| T3 | Fluensulfone 2% Gr@ 22500 g/ha | — | 450 | 14.7 | 77.13 *(79.62) | 32400 | 9.20 |
| T4 | Sulphur 80% WG@ 1500 g/ha | 1200 | — | 57.3 | 10.88 *(79.62) | 31800 | 7.17 |
| T5 | Untreated Control | — | — | 64.3 | | 29670 | |

SC: Suspoemulsion composition
DAS: Days after spray
*Synergy calculation

It can be seen from table 10 that the application of Treatment 1 with Sulphur 40%+Fluensulfone 15% SE@3000 g/ha and Treatment 2 with Sulphur 20%+Fluensulfone 7.5% SE @ 6000 g/ha, as per the embodiment of present invention, showed a 93.15% and 93.62% reduction in nematode control over the untreated control as compared to treatments 3 and 4 with individual actives which only showed a 77.13% and 10.88% reduction in nematode control over the untreated, respectively. Treatments with compositions as per the embodiments of the present invention were highly effective in controlling the nematode pests in tomato at 70 days after application as compared to the Treatments 3 and 4 where sulphur and fluensulfone are applied individually. The enhancement in efficacy with the composition as per the present invention is surprising as the dosages of sulphur and fluensulfone applied in individual treatments and in compositions as per the present invention are the same. The surprising synergistic results of treatment 1 and 2, are attributed to the composition of sulphur and fluensulfone, as per the embodiments of the invention, where both the actives are present in a single composition in specific concentration. The enhanced efficacy is further attributed to the form of the composition, i.e. suspoemulsion as shown in the present study, which includes particles in the size range of 0.1 micron to 30 microns.

Further, the composition as per the embodiment of the present invention, on account of significant control of the nematode population and due to the presence of sulphur in the composition not only assists in controlling the pests, but also additionally provides nutrition to the plant, thus showing a significant enhancement in the yield as well as other crop characteristics such as plant height, root length, fruit size and improved foliage, as compared to the yield observed with individual applications of sulphur and fluensulfone.

Field Trial 6: To Study Effect of Elemental Sulphur and Fluensulfone for Controlling Nematode Pest in Brinjal.

The field trials were carried out to study the effect of the composition of elemental sulphur and fluensulfone on controlling nematode pests in Brinjal. The trial was laid out during Rabi season i.e. January to April in Randomized Block Design (RBD) with five treatments including untreated control, replicated four times. The test product sample, sulphur and fluensulfone, alone and in combination with prescribed dose were applied as soil application after planting of brinjal seedlings in the trial plot. The brinjal crop in the trial field was raised following good agricultural practices.

Details of Experiment a) Trial Location: 24 Parganas, West Bengal b) Crop: Brinjal c) Experiment season: Rabi d) Trial Design: RBD e) Replications: Five f) Treatments: Five g) Plot size: 5×6=30 sqm h) Date of sowing: 10.12.2021 i) Date of Application: 10.12.2021 j) Method of application: Soil application near root zone k) Crop variety: Arka Neelkanth l) Date of Harvesting: 10.03.2022

The observation on crop damage caused by *Meloidogyne incognita* were recorded at 90 days after planting of the brinjal plant from each plot and the percentage control was calculated using following formula:

$$\text{Control (\%)} = [\text{Damage in control plot} - \text{Damage in treated plot}] / \text{Damage in control plot} \times 100$$

The mean data on control against the nematode pests along with the crop yield was recorded at harvest and is presented in the Tables 11 and 12:

51

TABLE 11

| Treatment No. | Composition | Active ingredient (grams/ha) | | *No of nodules/plant (Mean of 10 plants) at 90 DAS | % Reduction of nematode infection over control (90 DAS) | yield in kg/ha | % yield increase |
|---|---|---|---|---|---|---|---|
| | | Sulphur | fluensulfone | | | | |
| T1 | Sulphur 30% + Fluensulfone 15%) ZC @ 3000 g/ha according to an embodiment of the present invention. | 900 | 450 | 4.7 | 92.79 *(81.01) | 28700 | 17.14 |
| T2 | Sulphur 20% + Fluensulfone 10%) ZC @ 4500 g/ha according to an embodiment of the present invention. | 900 | 450 | 4.9 | 92.48 *(81.01) | 28300 | 15.51 |
| T3 | Fluensulfone 2% Gr@ 22500 g/ha | — | 450 | 14.7 | 77.45 *(81.01) | 25400 | 3.67 |
| T4 | Sulphur 80% WG@ 1125 g/ha | 900 | — | 54.9 | 15.79 *(81.01) | 26100 | 6.53 |
| T5 | Untreated Control | — | — | 65.2 | | 24500 | |

ZC: Composition which is a combination of suspension concentrate and capsulated suspension
DAS: Days after spray
*Synergy calculation
*Higher the number of nodules observed per plant, greater is the nematode infestation It can be seen from table 11 that the application of Treatment 1 with Sulphur 30%+Fluensulfone 15%) ZC @ 3000 g/ha and Treatment 2 with Sulphur 20%+Fluensulfone 10%) ZC A 4500 g/ha according to an embodiment of the present invention, as per the embodiment of present invention, showed a 92.79% and 92.48% reduction in nematode control over the untreated control as compared to treatments 3 and 4 with individual actives which only showed a 77.45% and 15.79% reduction in nematode control over the untreated, respectively. Treatments with compositions as per the embodiments of the present invention were highly effective in controlling the nematode pests in brinjal at 90 days after application as compared to the Treatments 3 and 4 where sulphur and fluensulfone are applied individually. The enhancement in efficacy with the composition as per the present invention is surprising as the dosages of sulphur and fluensulfone applied in individual treatments and in compositions as per the present invention are the same. The surprising synergistic results of treatment 1 and 2, are attributed to the composition of sulphur and fluensulfone, as per the embodiments of the invention, where both the actives are present in a single composition in specific concentration. The enhanced efficacy is further attributed to the form of the composition, i.e. a ZC composition which is a combination of a capsulated suspension and suspension concentrate composition, as shown in the present study, which includes particles in the size range of 0.1 micron to 30 microns.

Further, the composition as per the embodiment of the present invention, on account of significant control of the nematode population and due to the presence of sulphur in the composition not only assists in controlling the pests, but also additionally provides nutrition to the plant, thus showing a significant enhancement in the yield as well as other crop characteristics such as plant height, root length, fruit size and improved foliage, as compared to the yield observed with individual applications of sulphur and fluensulfone.

TABLE 12

| Treatment No. | Composition | Active ingredient (grams/ha) | | *No of nodules/plant (Mean of 10 plants) at 90 DAS | % Reduction of nematode infection over control (90 DAS) | yield in kg/ha | % yield increase |
|---|---|---|---|---|---|---|---|
| | | Sulphur | fluensulfone | | | | |
| T1 | Sulphur 30% + Fluensulfone 1.5%) ZC @ 6000 g/ha according to an embodiment of the present invention. | 1800 | 90 | 7.8 | 87.75 *(67.88) | 29700 | 22.72 |
| T2 | Sulphur 20% + Fluensulfone 1%) ZC @ 9000 g/ha according to an embodiment of the present invention. | 1800 | 90 | 8.4 | 86.81 *(67.88) | 29100 | 20.24 |
| T3 | Fluensulfone 2% Gr@ 4500 g/ha | — | 90 | 24.4 | 61.69 *(67.88) | 25900 | 7.02 |
| T4 | Sulphur 80% WG@ 2250 g/ha | 1800 | — | 53.4 | 16.16 *(67.88) | 26300 | 8.67 |
| T5 | Untreated Control | — | — | 63.7 | | 24200 | |

ZC: Composition which is a combination of suspension concentrate and capsulated suspension
DAS: Days after spray
*Synergy calculation
*Higher the number of nodules observed per plant, greater is the nematode infestation It can be seen from table 12 that the application of Treatment 1 with Sulphur 30%+Fluensulfone 1.5%) ZC @ 6000 g/ha and Treatment 2 with Sulphur 20%+Fluensulfone 3%) ZC @ 9000 g/ha according to an embodiment of the present invention, showed a 87.75% and 86.81% reduction in nematode control over the untreated control as compared to treatments 3 and 4 with individual actives which only showed a 61.69% and 16.16% reduction in nematode control over the untreated, respectively. Treatments with compositions as per the embodiments of the present invention were highly effective in controlling the nematode pests in brinjal at 90 days after application as compared to the Treatments 3 and 4 where sulphur and fluensulfone are applied individually. The enhancement in efficacy with the composition as per the present invention is surprising as the dosages of sulphur and fluensulfone applied in individual treatments and in compositions as per the present invention are the same. The surprising synergistic results of treatment 1 and 2, are attributed to the composition of sulphur and fluensulfone, as per the embodiments of the invention, where both the actives are present in a single composition in specific concentration. The enhanced efficacy is further attributed to the form of the composition, i.e. a ZC composition which is a combination of a capsulated suspension and suspension concentrate composition, as shown in the present study, which includes particles in the size range of 0.1 micron to 30 microns.

Thus the inventors of the present invention evaluated the composition of elemental sulphur and fluensulfone or salts or derivatives thereof on crops such as cow pea, tomato, brinjal, etc. It was observed that the composition of the present invention provides enhanced control of nematode pests as compared to application of individual actives. Further the composition of the invention not only helps in improving the crop yield, but also exhibits improved crop physiological characteristics like root length, plant height, fruit size and improved foliage. Thus, it has been observed that the compositions of the present invention, demonstrate enhanced, efficacious and superior behavior in the fields.

The inventors determined that the solid compositions as per the invention with the combination of finely selected properties namely specific granule size, where the granules comprise particles of specific size range, or wettable powders with specific size range, where these compositions have good wettability, suspensibility and dispersibility; along with liquid compositions with good viscosity and suspensibility results in a composition, which provides immediate availability of actives to the crops or the plants facilitating nutrition and protection to the crops during its growing stages. Furthermore, the compositions in the form of water dispersible granules of capsulated suspensions and ZC composition which is a combination of suspension concentrates and capsulated suspension, also provides for continuous and sustained release of the actives during the entire crop life cycle, thus, providing an effective crop protection and nutritive solution to the crops. Because of its ease of application, the composition of the invention is highly economical to the end user.

From the foregoing, it will be observed that numerous modifications and variations can be effectuated without departing from the true spirit and scope of the novel concepts of the present invention. It is to be understood that no limitation with respect to the specific embodiments illustrated is intended or should be inferred.

I claim:

1. A pesticidal composition, comprising:
   elemental sulphur in a range of 20% w/w to 90% w/w of the pesticidal composition;
   fluensulfone or salts or derivatives or mixtures thereof in a range of 0.1% w/w to 30% w/w of the pesticidal composition; and
   at least one agrochemically acceptable excipient.

2. The pesticidal composition of claim 1, wherein the pesticidal composition is in a form of a solid, a form of a liquid, or a form of a gel.

3. The pesticidal composition of claim 2, wherein the pesticidal composition in the form of a solid is in a form of one of: wettable powders, water dispersible granules, or water dispersible granules of capsulated suspension.

4. The pesticidal composition of claim 3, wherein the pesticidal composition in the form of a solid is in the form of the water dispersible granules or the water dispersible granules of capsulated suspension, and wherein the water dispersible granules or the water dispersible granules of capsulated suspension are in a size range of from 0.1 mm to 3 mm.

5. The pesticidal composition of claim 2, wherein the pesticidal composition is in the form of a solid.

6. The pesticidal composition of claim 2, wherein the pesticidal composition in the form of a liquid is in a form of one of: liquid suspension, suspension concentrate, suspoemulsion, or a ZC composition, and wherein the ZC composition comprises a combination of capsulated suspension and the suspension concentrate.

7. The pesticidal composition of claim 6, wherein the pesticidal composition in the form of a liquid has a viscosity of 10 cps to 3000 cps.

8. The pesticidal composition of claim 6, wherein the pesticidal composition in the form of a liquid has a pourability of less than 5% residue.

9. The pesticidal composition of claim 2, wherein the pesticidal composition in the form of a liquid comprises the elemental sulphur in a range of 20% w/w to 60% w/w of the pesticidal composition; and the fluensulfone or salts or derivatives or mixtures thereof in a range of 0.1% w/w to 15% w/w of the pesticidal composition.

10. The pesticidal composition of claim 1, wherein the pesticidal composition comprises particles in a size range of 0.1 micron to 30 microns.

11. The pesticidal composition of claim 1, wherein the pesticidal composition further comprises at least one active ingredient selected from: macronutrients; micronutrients; biostimulants; fertilizers; pesticidal actives; plant growth regulators; algae; and mixtures thereof.

12. The pesticidal composition of claim 1, wherein the at least one agrochemically acceptable excipient is selected from: surfactants, binders, or binding agents; wetting agents; emulsifiers; fillers or carriers or diluents; coating agents; buffers or pH adjusters or neutralizing agents; antifoaming agents or defoamers; penetrants; UV protecting agents; UV absorbents; UV rays scattering agents; stabilizers; pigments; colorants; structuring agents; chelating or complexing or sequestering agent; thickeners; suspending agents or suspension aid agents or anticaking agents or anti-settling agents; viscosity modifiers or rheology modifiers; tackifiers; humectants; spreading agents; sticking agents; anti-freezing agent or freeze point depressants; solvents; preservatives or bactericides or anti-fungal agents or biocides or anti-microbial agents or antioxidants, polymers, monomers, crosslinking agents, permeability enhancing agents, protective colloids; and mixtures thereof.

13. A process for preparing the pesticidal composition of claim 1 in a form of water dispersible granules, wherein the process comprises:
   a. obtaining a blend of the elemental sulphur and the fluensulfone or salts or derivatives or mixtures thereof with the at least one agrochemical excipient to obtain a slurry or a wet mix; and
   b. milling the wet mix or the slurry to a desired particle size; and
   c. drying the wet mix to obtain the pesticidal composition in the form of water dispersible granules.

14. A process for preparing the pesticidal composition of claim 1 in a form of a wettable powder, wherein the process comprises:
   a. mixing the fluensulfone or salts or derivatives or mixtures thereof with the at least one agrochemical excipient to obtain a first mixture;
   b. mixing the elemental sulphur with the at least one agrochemical excipient to obtain a second mixture; and c. milling the first mixture and the second mixture together and then drying to obtain the pesticidal composition in the form of a wettable powder.

15. A process for preparing the pesticidal composition of claim 1 in a form of water dispersible granules of capsulated suspension, wherein the process comprises:

a. preparing a suspension concentrate of the elemental sulphur by:

i. adding the at least one agrochemically acceptable excipient to a first water and then adding the elemental sulphur to the first water to form a slurry, and ii. milling the slurry using a suitable wet mill to obtain the suspension concentrate of the elemental sulphur, wherein the suspension concentrate of the elemental sulphur has particles of a desired size;

b. preparing a capsulated suspension of the fluensulfone or salts or derivatives or mixtures thereof by:

i. dissolving the fluensulfone or salts or derivatives or mixtures thereof in a suitable oil, adding a polymer precursor to the suitable oil and emulsifying the suitable oil in a second water using a suitable homogenizer, and ii. adding a crosslinker for the polymer precursor in the second water either alone or optionally along with the at least one agrochemically acceptable excipient;

c. adding the capsulated suspension of fluensulfone or salts derivatives or mixtures thereof to the suspension concentrate of the elemental sulphur under continuous stirring to form a mixture; and d. adding the at least one agrochemically acceptable excipient to the mixture and then spray drying the mixture to obtain the pesticidal composition of in the form of water dispersible granules of capsulated suspension.

16. A process for preparing the pesticidal composition of claim 1 in a form of a liquid suspension, wherein the process comprises:

a. homogenizing a mixture of the elemental sulphur, the fluensulfone or salts or derivatives or mixtures thereof, and the at least one agrochemically acceptable excipient to obtain a suspension; and b. wet milling the suspension to obtain the pesticidal composition in the form of a liquid suspension.

17. A process for preparing the pesticidal composition of claim 1 in a form of a suspoemulsion, wherein the process comprises:

a. dissolving the fluensulfone or salts or derivatives or mixtures thereof in an oil or a solvent and preparing a concentrated emulsion with required agrochemical excipients to obtain a first fraction;

b. mixing the elemental sulphur with the at least one agrochemically acceptable excipient to obtain a second fraction which is then milled to a desired particle size; and c. mixing the first fraction and the second fraction in a mass mixer to obtain the pesticidal composition in the form of a suspoemulsion.

18. A process for preparing the pesticidal composition of claim 1 in a form of a ZC composition, wherein the ZC composition comprises a combination of a suspension concentrate and a capsulated suspension composition, and wherein the process comprises:

a. preparing a suspension concentrate of the elemental sulphur by:

i. adding the at least one agrochemically acceptable excipient to a first water and suspending the elemental sulphur in the first water to form a slurry, and ii. milling the slurry using a suitable wet mill to obtain the suspension concentrate of the elemental sulphur, wherein the suspension concentrate of the elemental sulphur has particles of a desired size b. preparing a capsulated suspension of the fluensulfone or salts or derivatives or mixtures thereof by:

i. dissolving the fluensulfone or salts or derivatives or mixtures thereof in a suitable oil, adding a polymer precursor to the suitable oil and emulsifying the suitable oil in a second water using a suitable homogenizer, and ii. adding a crosslinker for the polymer precursor to the second water either alone or optionally along with the at least one agrochemically acceptable excipient;

c. adding the capsulated suspension of fluensulfone or salts or derivatives or mixtures thereof to the suspension concentrate of elemental sulphur under continuous stirring to form a mixture of suspension concentrate and capsulated suspension; and d. optionally, adding the at least one agrochemically acceptable excipient to the mixture of suspension concentrate and capsulated suspension, to obtain the pesticidal composition in the form of a ZC composition.

19. A method of treating at least one of:

a) a plant, b) a crop, c) a plant propagation material, d) a locus, e) a seedling, f) parts or seed of any of a) through e), or g) soil, with the pesticidal composition of claim 1.

\* \* \* \* \*